United States Patent [19]

Ducote

[11] Patent Number: 5,305,844

[45] Date of Patent: Apr. 26, 1994

[54] REMOTE STEERING OF ON-HIGHWAY VEHICLES

[76] Inventor: Edgar A. Ducote, P.O. Box 45654, Baton Rouge, La. 70895

[21] Appl. No.: 807,199

[22] Filed: Dec. 16, 1991

Related U.S. Application Data

[60] Division of Ser. No. 594,716, Oct. 9, 1990, Pat. No. 5,135,064, which is a continuation-in-part of Ser. No. 337,292, Apr. 13, 1989, Pat. No. 5,026,085.

[51] Int. Cl.$^5$ ............................................. B62D 61/10
[52] U.S. Cl. .................... 180/24.01; 180/79; 280/91; 280/96
[58] Field of Search ....................... 280/91, 96, 98, 99, 280/103, 95.1, 771, 775; 180/24.01, 24, 23, 79, 79.5

[56] References Cited

U.S. PATENT DOCUMENTS

| 1,402,175 | 1/1922 | Overman | 180/24.01 |
|---|---|---|---|
| 1,454,162 | 5/1922 | Furlong | 180/24.01 |
| 1,619,941 | 3/1927 | Kennedy | 280/426 |
| 1,835,112 | 12/1931 | Hawkins | 280/104 |
| 1,856,787 | 5/1932 | Schellentager et al. | 180/24.01 |
| 1,871,432 | 8/1932 | Fageol | 280/91 |
| 2,286,166 | 6/1942 | Carmody | 280/33.55 |
| 2,389,752 | 11/1945 | Avery | 280/33.5 |
| 2,925,285 | 2/1960 | Haas | 280/426 |
| 2,959,428 | 11/1960 | Feldurn | 280/426 |
| 3,092,398 | 6/1963 | Droeske | 280/426 |

(List continued on next page.)

FOREIGN PATENT DOCUMENTS

| 0282426 | 9/1988 | European Pat. Off. | 280/426 |
|---|---|---|---|
| 0299851 | 1/1989 | European Pat. Off. | 280/426 |
| 0958080 | 1/1957 | Fed. Rep. of Germany | 280/426 |
| 0240190 | 4/1962 | Fed. Rep. of Germany | 280/426 |
| 1957662 | 5/1971 | Fed. Rep. of Germany | 280/442 |
| 2260739 | 7/1973 | Fed. Rep. of Germany | 280/426 |
| 2312565 | 9/1974 | Fed. Rep. of Germany | 280/426 |
| 0486969 | 12/1953 | Italy | 280/426 |
| 67168 | 4/1984 | Japan | 280/91 |
| 203474 | 8/1988 | Japan | 280/91 |
| 94330 | 4/1960 | Netherlands | 280/426 |
| 556066 | 6/1977 | U.S.S.R. | 280/442 |
| 765083 | 9/1980 | U.S.S.R. | 180/134 |
| 0921928 | 4/1982 | U.S.S.R. | 280/426 |
| 0148255 | 10/1921 | United Kingdom . | |
| 0525824 | 9/1940 | United Kingdom . | |

OTHER PUBLICATIONS

*McGraw-Hill Encyclopedia of Science and Technology,* vol. 1, pp. 56, 746, 752, 753, 755; vol. 3, p. 451; vol. 5, p. 526; vol. 13, pp. 110–112, New York: McGraw-Hill Book Co., 1977.

*Encyclopedia Brittannica,* vol. 18, pp. 721–723, Chicago: Encyclopedia Britannica, Inc., 15th edition.

*Primary Examiner*—Margaret A. Focarino
*Assistant Examiner*—Kevin Hurley
*Attorney, Agent, or Firm*—Reginald F. Roberts, Jr.

[57] ABSTRACT

Motor vehicles in which steerable wheels aft of the front wheels are steered by the same steering wheel which steers the front wheels. In one aspect the present invention provides an extended motor vehicle thus steered, and in a second aspect a tractor-trailer assembly in which the trailer is steered from the tractor. In one embodiment a mechanical power train is used to forcibly steer the steerable wheels aft of the front wheels. In a second embodiment the wheels are steered electronically, and in a third embodiment they are steered pneumatically. For extended vehicles the steerable wheels aft of the front wheels are forcibly steered in response to the position of the Pitman arm which controls the front wheels. For tractor-trailer assemblies a directional sensor is disposed and held in the V-shaped slot of the fifth wheel of the tractor, and the steerable wheels on the trailer are forcibly steered in response to the direction of motion of the tractor sensed by the sensor.

4 Claims, 13 Drawing Sheets

U.S. PATENT DOCUMENTS

| | | | |
|---|---|---|---|
| 3,149,858 | 9/1964 | Gilbert | 280/442 |
| 3,486,576 | 12/1969 | Breon et al. | 180/79.2 |
| 3,533,644 | 10/1970 | Humes | 280/426 |
| 3,712,641 | 1/1973 | Sherman | 280/426 |
| 3,734,538 | 5/1973 | Humes | 280/426 |
| 4,017,094 | 4/1977 | Pilcher | 280/404 |
| 4,120,509 | 10/1978 | Reeve et al. | 280/81.6 |
| 4,223,913 | 9/1980 | Fry | 180/24.01 |
| 4,244,596 | 1/1981 | Chung | 280/426 |
| 4,441,730 | 4/1984 | Damm | 280/426 |
| 4,441,735 | 4/1984 | Hutchison et al. | 280/96 |
| 4,463,966 | 8/1984 | Stoddard | 280/442 |
| 4,468,047 | 8/1984 | McGhrie et al. | 280/419 |
| 4,484,758 | 11/1984 | Murray et al. | 280/442 |
| 4,570,965 | 2/1986 | Casiwell | 280/426 |
| 4,586,578 | 5/1986 | Brown et al. | 180/14.4 |
| 4,740,006 | 4/1988 | Ducote | 280/426 |
| 4,805,940 | 2/1989 | Ohno et al. | 280/91 |
| 4,881,748 | 11/1989 | Sano et al. | 280/91 |
| 4,941,671 | 7/1990 | Ellingsen | 280/91 |
| 4,969,533 | 11/1990 | Holm et al. | 280/96 |

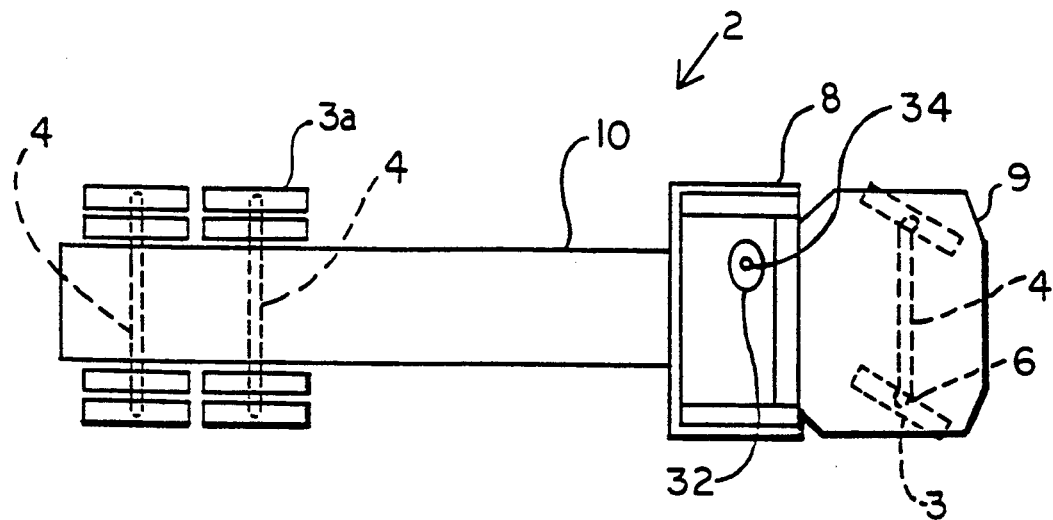
PRIOR ART • FIGURE 1
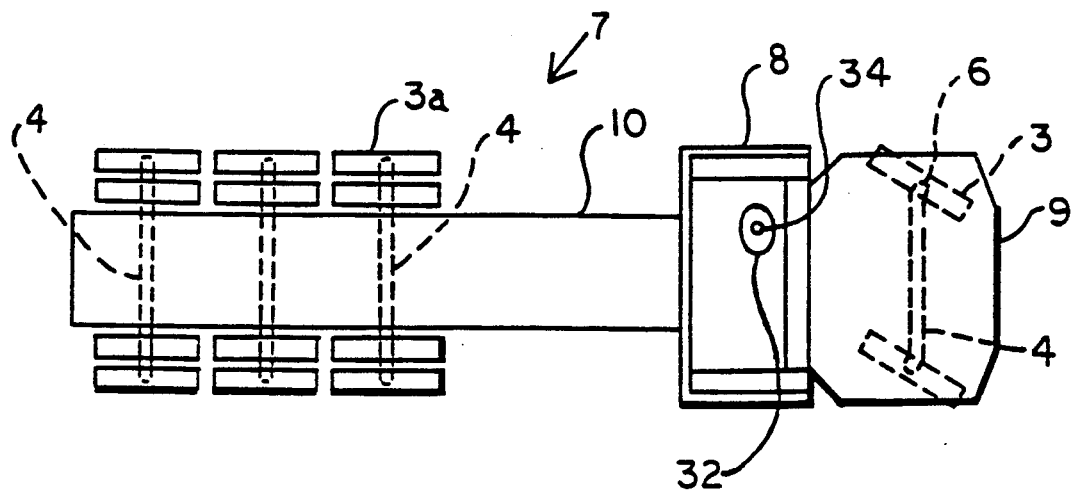
PRIOR ART • FIGURE 2

REMOTE STEERING OF ON-HIGHWAY VEHICLES

This is a division of application Ser. No. 594,716, filed Oct. 9, 1990 U.S. Pat. No. 5,135,064, which is a continuation-in-part of application Ser. No. 337,292, filed Apr. 13, 1989, which is now U.S. Pat. No. 5,026,085.

BACKGROUND OF THE INVENTION

The present invention relates to motor vehicles. More particularly, the invention relates to on-highway vehicles designed to operate at highway speeds.

Special terms used herein are defined as follows:

Forward: Toward the front end of the vehicle.

Aft: Toward the rear end of the vehicle.

Highway speeds: Speeds in excess of fifty miles per hour.

Extended motor vehicle: A motor vehicle having an elongated, integral chassis.

Elongated: Substantially longer than a conventional automobile or "pickup" truck; having a length of from about twenty feet to about forty feet.

Integral: Unitary; not segmented; not formed e.g. like a tractor-trailer.

Axle: A shaft which connects wheels located on opposite sides of a frame which is supported by the shaft.

Short axle: A shaft which connects a pair of wheels on the same side of the frame.

Spindle: A short conical shaft on which a wheel is mounted.

Driving axle: Axle that is power-driven.

Fixed axle: An axle permanently aligned in a particular configuration with respect to the frame.

Steerable axle: An axle which is capable of changing direction with respect to the frame.

Tandem axles: A pair of axles very near one another; not spaced apart or separated by a distance of more than about two or three feet.

Tridem axles: Three axles very near one another; not spaced apart or separated by a distance of more than about two or three feet.

Spread axles: Axles spaced apart and separated by a distance of from about four feet to about six feet.

Fixed wheel: A wheel the orientation of which remains unchanged with respect to an axle on which the wheel is mounted.

Steerable wheel: A wheel which is capable of changing direction with respect to and independently of a fixed axle to which the wheel is connected by a spindle.

Microprocessor: Any electrical device or combination of electrical components which is capable of performing the functions of a microprocessor as set forth in the specification and claims.

Much of the background information relating to the present invention may be found in U.S. Pat. No. 4,740,006 to Ducote and in application Ser. No. 377,292, which are hereby incorporated by reference.

Motor vehicles encompassed by the present invention include tractor-trailer assemblies, recreational-vehicle (RV) motor homes, boat-trailer assemblies, trucks, busses, moving vans, and passenger vans.

Trucks, tractors, and trailers are well described in the *Encyclopedia Britannica*, volume 18, pages 721-723, hereby incorporated by reference.

More specifically, reference is made to FIGS. 1 and 2, which represent prior-art embodiments of extended motor vehicles.

A first prior-art embodiment 2 (FIG. 1) comprises a frame 9 and chassis 10 mounted on a first fixed axle 4 with steerable wheels 3 connected thereto. This first axle 4 is positioned at or near the front end of the vehicle 2. A pair of tandem axles 4 support the rear end of the vehicle. The tandem axles 4 are provided with fixed wheels 3a.

A second prior-art embodiment 7 is shown in FIG. 2. In this embodiment the frame 9 and chassis 10 are mounted on a first fixed axle 4 having steerable wheels 3 at or near the front end of the vehicle 7, and a group of tridem fixed axles with fixed wheels 3a at or near the rear end of the vehicle 7.

Special and serious problems are inherent in the vehicles depicted in FIGS. 1 and 2, because of the tandem and tridem axles 4 and the fixed wheels 3a. Each axle 4 of the tandem and tridem arrangement, when the vehicle 2 or 7 is making a turn, is continuously dragging and destabilizing the wheels 3a of the lead axle 4. This can cause loss of control to a greater or lesser extent, depending upon the speed of the vehicle and the sharpness of the turn. Other undesirable effects include excess tire wear and loss of the extra energy required to overcome the sliding friction of the rear wheels, as compared to rolling friction. Moreover, the sidewise dragging of the wheels 3a and axles 4 causes excessive wear of the axles, suspensions, and other components, thereby increasing maintenance and replacement costs. Fire trucks and other extended emergency vehicles are at risk with respect to loss of stability, particularly at high speeds and in congested traffic. All of these potential and inherent problems apply to mobile homes and extended military vehicles, as well as to tractor-trailer combinations.

A second problem inherent in the prior-art extended vehicles is a long wheel base or turning radius. Because the only steerable wheels are in the front end of the vehicle, all of the strain of steering the vehicle in a turn falls thereon, with the frequent result that the front wheels fail to "grab." They slip, thereby causing the vehicle to make an excessively wide turn. In so doing, the vehicle often "rides" on the curb or swings into the lane of oncoming traffic. Both situations are rife with hazard.

U.S. Pat. No. 1,402,175 to Overman, issued Jan. 3, 1922, discloses municipal and cross-country trucks having more driving wheels than two, in order to increase the traction and pulling power of such motor vehicles, and to distribute the load over more points of support. Overman discloses a truck chassis having eight wheels, six of which are drivers. Steering knuckles (9,9) are pivoted to the front axle, and are connected by a parallel rod (10). Wheels (11,11) are mounted on the steering knuckles (9,9). A block (7) rests upon a fifth wheel which is connected by a king pin (13) with a longitudinal bolster (14). Each end of the bolster (14) bears upon the fifth wheel and are respectively connected by king pins (15 and 16) with transverse bolsters (17, 18). The bolsters (17,18) have eyes to which diagonal rods (36,37) are connected by pivot bolts through corresponding eyes in the ends of the rods, so that when bolster 17 is moved about king pin 15, bolster 18 is moved correspondingly in an opposite direction. The front bolster 19 is connected with the main frame (5) by diagonal rods (38,39). When the front wheels are manually turned by moving the steering knuckles (FIG. 1) or the front axle (FIG. 4), the front end of the body 5 correspondingly follows their lead, and the body turns about king pin 13 as a center, whereupon the diagonal rod 38 (FIG. 4) swings the front bolster (17) about king pin 15, and the rod 37 swings the rear bolster 18 about king pin 16, to cause the vehicle to make a curve properly without interfering with the power transmission from the motor to the axles through the propeller shafts and gears. A middle bolster (21) is rigidly connected to the longitudinal bolster 14 and is thereby controlled in its position by the bolster 14. There are thus no fixed axles in the motor vehicle disclosed by Overman, and steerage is by steerable axles.

U.S. Pat. No. 1,454,162 to Furlong, issued May 8, 1923, discloses motor vehicle having a first fixed axle at the front end, with steerable wheels mounted thereon and steered by a steering wheel. There is a first steerable axle at the rear end of the vehicle. There is a second fixed axle with fixed wheels just aft of the first fixed axle; and a second steerable axle forward of the first steerable axle and aft of the second fixed axle. There is no second fixed axle with steerable wheels.

U.S. Pat. No. 1,835,112 to Hawkins, issued Dec. 8, 1931, discloses a motor vehicle having at least three pairs of proximately-located wheels, in which the load distribution to the wheels is such that a simple light steering mechanism can be employed and in which the load is distributed equally or as desired to each of the wheels. Each of the driving axles (326) are spaced from the main frame (327) by torque arms (328) rigidly affixed to the axles and universally connected to cross members (329). Each driving axle (326) is provided, adjacent one end, with a hemispherical saddle (331) in which a ball (332) is seated and retained for universal movement by an apertured hemispherical cap (333). An upright stem (334) is attached to the ball (332), and extends through the aperture in the cap (333). The stem is enlarged intermediate its ends to form a piston (336) which is free to slide in a cylinder (337) depending from a housing (338) affixed to the main frame (327) by a ball-and-socket joint (339). The upper end of the stem (334) is enlarged into a mushroom or circular convex disc 341 which bears against a bag (342) of rubber or other suitable material retained in the housing (338) by an apertured cap (343). The bag (342) is connected by an elbow (345) and a flexible hose (344) to a pipe (346) which serves as a main interconnection of the hoses of all the pneumatic cylinders disposed along one side of the vehicle. One side of each driving axle (326) is provided with a cylinder (347) mounted between two ball-and-socket joints as described, while the other side of the axle is provided with a similar cylinder (347) connected to the axle by a ball-and-socket joint (348) and to the main frame (327) by a pin (349) journalled in a bracket (351) attached to the frame. The non-driving axles (352) are also provided with pneumatic cylinders (347) adjacent each end. The cylinders (347) are rigidly attached to the main frame (327), and one of them is pivoted to the axle (352) by a pin (353) which passes through a forked seat (354) on the axle, and through an aligned aperture in the rod (356) which is otherwise similar to the rod 334. The other pneumatic cylinder is attached to the axle 352 by a shackle comprising a link (357) pivoted at one end to a forked seat (358) on the axle, and pivoted at the opposite end to the rod (359) in other respects like the rod (334). From the foregoing description it should be clear that it is the axles, not the wheels, which are steered. In a second embodiment steerable wheels are mounted directly on the frame.

U.S. Pat. No. 1,856,787 to Schellentrager et al., issued May 3, 1932, discloses a motor vehicle comprising a frame, a load-carrying platform mounted on the frame, drive and steering wheels carried by the frame, a steering mechanism for the steering wheels, a source of power supported on the frame, power means to propel and to load the vehicle, control means for the vehicle, and safety means for the vehicle. The frame is articulate, and comprises parts A, B, C, D, and E hinged together. Hence, the vehicle disclosed by Schellentrager et al. is neither a unitary extended vehicle nor a tractor-trailer assembly.

U.S. Pat. No. 1,871,432 to Fageol, issued Aug. 9, 1932, discloses a road vehicle having two pairs of steerable wheels mounted on two fixed axles at the front end of the vehicle. These axles and wheels are in tandem. There are two fixed axles bearing fixed wheels at the rear of the vehicle, also in tandem. There are no spread axles. There are no steerable wheels aft of the front wheels.

U.S. Pat. No. 3,486,576 to Breon et al., issued Dec. 30, 1969, discloses a steering system for a multiple-axle vehicle. The steering system includes a plurality of hydro-mechanical steering-jack systems interconnected by a mechanical linkage which has an anticipator cylinder therein for taking up slack in the linkage regardless of the direction in which the vehicle is to be steered. Steerable wheels are mounted directly on the frame, not on axles.

U.S. Pat. No. 4,740,006 to Ducote discloses a remote-control steering system for tractor-trailer assemblies and the like. All trailer axles are load-bearing and fixed. The rearmost axle on the trailer has fixed wheel mountings, and serves as a pivot for turning the trailer when it moves in either a forward or a reverse direction. The axle or axles located forward of the rearmost axle of the trailer and aft of the trailer king pin has or have directional wheels that automatically track and follow in concentric pattern the path of the rear wheels of the towing vehicle. The motive force for steering the directional wheels emanates from a sensor nested in the V-slot of the fifth wheel of the towing vehicle. The steering system is designed to be installed as a retrofit to existing trailers, or as optional equipment for trailers not yet manufactured. Abling and disabling the system is automatic. Abling takes place when the fifth wheel is moved into position to couple the king pin of the trailer. The system is disabled when locking lugs for the fifth wheel are released, and the fifth wheel moves away from the king pin.

British (GB) Patent No. 148,255 discloses a motor vehicle which includes an airscrew-drive in combination with means enabling the vehicle to travel on difficult terrain. The enabling means comprise three or more axles and a corresponding number of wide wheels. There are from two to four fixed axles with steerable wheels, but there is no fixed axle with fixed wheels to act as a pivot point.

GB Patent No. 525,824 discloses a motor vehicle having one pair of driving wheels each with twin tires thereon, the driving axle being loaded to carry approximately twice the load applied to any of the other three pairs of wheels, each of which has a single tire thereon. There are two pairs of wheels which are moved for steering purposes. The other pair of non-driven wheels may be disposed either in front or to the rear of the driven wheels. There is one pair of steerable wheels on a first fixed axle at the front end of the vehicle. There is a second pair of steerable wheels on a second fixed axle aft of the first axle. There are two pairs of fixed wheels on a third fixed axle aft of the second axle. There is one pair of fixed wheels on a fourth fixed axle at the rear end of the vehicle or forward of the third axle. The two forward axles are spread; the two aft axles are tandem. There are no steerable wheels at the rear end of the vehicle.

Tractor-trailer combinations known as "eighteen-wheelers" present special problems. FIG. 12 shows a top plan view of a first type of eighteen-wheeler presently in use, generally denoted by the numeral 9a. The frame 10a of a trailer 2a is supported near the front end by the frame 7a of a tractor 1a. The frame 7a is supported by a fixed front axle 4 provided with a pair of steerable wheels 3 mounted on a pair of spindles 6, and by two fixed rear axles 4, each of which is provided with two pairs of fixed wheels 3a. The trailer frame 10a is further supported by two fixed axles 4 near the rear of the trailer 2a. Each of these rear axles 4 is likewise provided with two pairs of fixed wheels 3a. A "fifth wheel" 8a is fastened to the frame 7a of the tractor 1a.

There are serious disadvantages inherent in the eighteen-wheeler 9a. The following examples are illustrative of the problems inherent therein.

(1) Because the only axles supporting the frame 10a of the trailer 2a are the two rear axles 4, approximately half the weight of the trailer 2a is borne by the frame 7a of the tractor 1a. An immediate consequence of this burden on the tractor 1a is that tractors pulling eighteen-wheelers must be large, heavy, and rugged enough to bear about half the weight of the trailer and of the payload, as well as the weight of the tractor itself. Clearly, if part of this extra weight could be borne by the trailer, it would be possible to utilize lighter and less expensive tractors. Furthermore, the portion of the fuel utilized to move the tractor alone could be considerably reduced, leading to even greater savings and to a significant advantage in fuel economy and energy conservation.

(2) Because there are only fixed wheels 3a supporting the trailer 2a, it is impossible for the trailer 2a to turn without some of the wheels 3a skidding or dragging to some extent. The farther apart the rear axles 4, the more serious is the problem of wheel drag. This problem causes loss of control, wasteful loss of rubber from the tires mounted on the wheels 3a, and wasteful loss of the extra energy required to overcome sliding friction as opposed to rolling friction. The trailer 2a is unstable in a turn. The faster the speed and the sharper the turn, the greater the instability.

(3) The fifth wheel 8a of the tractor 1a furnishes a leg to support the front end of the trailer 2a. However, it does not furnish full support for the full width of the front end of the trailer 2a. This deficiency causes the bed (not shown) of the trailer 2a to rock down on one side and up on the other side. The extent to which such rocking occurs depends on the turns that the trailer 2a makes, the imbalance of the load (which can be caused by shifting of the cargo in transit), road conditions, and other variables. This particular type of instability is almost continuous while the eighteen-wheeler 9a is in motion.

(4) Often the longitudinal center of the trailer, when loaded, is in continual up-and-down motion. This motion contributes to the instability of the trailer 2a, and may in extreme cases cause the trailer 2a to collapse at the longitudinal center.

(5) The looseness of the trailer king pin (not shown) in the fifth wheel 8a of the tractor 1a causes some shock, which contributes to a deficiency in traction and to a rough ride for both cargo and driver.

(6) Tandem axles are not equivalent to two single axles. Transportation authorities do not allow as much weight to be carried by a pair of tandem axles as by a pair of single axles.

(7) Tandem axles on either the tractor 1a or the trailer 2a, because they drag in a turn, can individually or in combination initiate a slide of the eighteen-wheeler 9a into a "jack-knife."

(8) The trailer 2a cannot independently furnish braking for the trailer and its payload (not shown). The push of the trailer 2a against the tractor 1a when brakes are applied to the tractor 1a causes the tractor 1a to yaw.

(9) There is nothing between the trailer 2a king pin (not shown) and the rear axles 4 of the eighteen-wheeler 9a to function as a load-bearing stabilizer for the trailer 2a. It is part of the function of the massive tractor 1a to counteract the sideward pull of the trailer 2a upon the tractor 1a when the tractor changes direction at highway speeds. The sharper the turn and the greater the speed, the greater is the pull of the trailer 2a on the tractor 1a.

(10) The existence of the problems just enumerated has caused the gradual emergency of heavier and more massive tractors 1a. These massive tractors have larger engines. The role of the tractor 1a is to pull, to steer, and to give stable traction to the eighteen-wheeler 9a while carrying its cargo at highway speeds. The heavier tractors 1a, along with Transportation Department load limits on tandem axles 4, cause the eighteen-wheeler 9a to carry less of a payload. The increased horsepower of the tractor 1a engines (not shown) results in lower fuel efficiency. These factors, in combination, raise the cost per ton-mile of hauling freight substantially.

In an attempt to alleviate these problems, prior-art devices have utilized steerable axles with fixed wheels for eighteen-wheelers; see, for example, U.S. Pat. Nos. 3,149,858, 3,533,644, 3,712,641, 3,734,538, 4,120,509, 4,244,596, and 4,463,966.

Special devices have also been devised for steering goose-neck trailers, the devices including steerable short axles, wheels steered by friction against the road, and rear wheels forcibly steered from the fifth wheel of the tractor.

These prior-art devices are expensive to manufacture and maintain; and, because of their specialized design, of limited utility. Additionally, the devices and methods described in these patents are not effective for negotiating high-speed turns on highways and public streets. They are, moreover, difficult to connect and disconnect. More specifically, when steerable axles are used to make a turn, the base of support provided by the axle is diminished proportionately to the degree of the turn.

More recently, a significant advance in the technology was made by Ducote, as disclosed by U.S. Pat. No. 4,740,006. Ducote discloses a steering system for use in a tractor-trailer combination in which all trailer axles are load-bearing and fixed. The rearmost axle on the trailer has fixed wheel mountings, and serves as a pivot axle for turning the trailer when the trailer moves in either forward or reverse direction. The axle or axles located forward of the rearmost axle of the trailer and aft of the trailer king pin has or have directional wheels which automatically track and follow in concentric pattern the path of the rear wheels of the tractor. The force for steering the directional wheels emanates from a sensor nested in the V-slot of the fifth wheel of the tractor. The system is capable of being retrofitted to existing trailers, or optionally being used as equipment for trailers not yet manufactured.

While Ducote's invention represents a tremendous advance over existing technology for solving the problems enumerated above, there have since come into prominence trailers with spread-tandem axles. As stated above, the greater the spread of the tandem axles, the more serious the problem of wheel-drag becomes. Spread-tandem axles are conventionally separated by a distance of about ten feet. Such a trailer is shown in FIG. 13 and designated by the numeral 2b.

These rigid spread-tandem axles with fixed wheels add another dimension to turning, in that these spread axles must be dragged around to make the turn. The distance by which the tires and wheels are dragged depends on the individual axle loads and the road surface under each of the tires. In any case they must be dragged into alignment, for every turn that the rig makes. To compensate for this sideways dragging, the driver makes an extra-wide turn. So, in the first place the driver turns wide to accommodate the length of the trailer; and in the second place, the driver turns wider yet to have additional distance for the dragging and instability of the rigid tandems to turns. The reason that the rigid spread tandems are used is that they are allowed the axle weight of single axles. This allowable weight is 20,000 pounds per axle. This helps them get through the Department of Transportation weight scales. This severe problem is evident at the access and exit ramps of interstate highways.

These problems are always with the driver. When driving in cities, the driver must find an intersection at which the driver is able to make a turn. The turn that is made is seldom an easy turn; it is a turn that the driver is barely able to make. Thus the driver and the rig must roll until the driver is able to find a suitable intersection. The time spent finding this begins at the point that the vehicle is loaded, and ends at the point the load is discharged.

"Sliders" are rear-axle groups mounted as a truck which is slidable on the beams of the trailer. One function of the slider is to shorten the wheelbase when the rig is unable to back into a tight place for unloading. When the driver sees that he or she is unable to back into an unloading spot, the driver parks the rig, gets out of the cab, manually unlocks the slider, gets back into the cab, locks the wheels of the slider, then backs up a few feet to shorten the wheelbase. The driver parks the rig again, and gets out of the cab again, and locks the slider again in this new position under the trailer. He or she gets back into the cab a third time, and backs the rig to a spot where it can be unloaded. Though the driver has shortened the wheelbase, it is still usually not short enough. The driver will still run over curbs and medians, in order to get the rear of the trailer to the right spot.

"Extendables" are semi-trailers that telescope out to accommodate the length of reinforced concrete pilings, steel beams, and other structural members. These extended trailer have aggravated problems in turning because of their extra length.

Military semis are used to transport tanks and other military vehicles and equipment. These long semi-trailers have all of the problems of other long semi-trailers. Additionally, they are used in peaceful transport of military vehicles in old-world cities. The streets in many of these old-world cities are narrow, having been built for horse-drawn vehicles. Due to the present international situation, an extraordinary number of military semis are in use.

Transportation needs have caused semis to be built longer as time goes on. The longer the semi-trailer, the more difficult it is for the tractor-trailer 9a (FIG. 13) to get around an intersection or make a turn. There are many instances every day of tractor-trailers intruding in the adjacent lanes of traffic to make a turn. This is a dangerous practice, and disrupts traffic that is sometimes already heavy. Another problem is that the rear wheels of the trailer 2b ride over the curbs, sidewalks, and medians. This demolishes curbs and street signs, and brushes utility poles, which is damaging to both the trailer and the utility pole. This problem is particularly severe at intersections and ramps that lead to and from interstate highways.

Emergency vehicles and hook-and-ladder semis for fire-fighting have a greater problem with this situation because of the length of the semi-trailers.

To alleviate the problems arising from spread axles, dump valves are being used for one of the two axles on the spread. By exhausting the air springs of one axle, the axle no longer is under load and can travel through a tight curve more easily. Most spread-tandem platforms dump the air from the rearmost axle. By doing so, the platform has the maneuverability of a trailer that is significantly shorter.

Suspension manufacturers teach that the dump-valve system was intended for limited use, such as tight ninety-degree turns, backing into loading docks, maneuvering within a yard, and other "creep-speed" applications. But the improved maneuverability is leading some drivers to dump air when making moderate curves at speeds of about thirty miles per hour.

Accordingly, some trailer and component manufacturers are starting to object to what they consider abuse of the dump valve. The Spicer Trailer Products Division of Dana Corporation issued an engineering update stating that the company would not warrant the axles used on spread-axle trailers equipped with dump valves. In pertinent part, the update reads as follows:

"When a dump valve is actuated, the axle equipped with the dump system sees only its own weight and that of the attached suspension components, unless a regulator is used to maintain some air pressure in the air bag. The other axle sees the full load normally carried by both axles, causing severe overloading of that axle. Unless such dump valves can be provided to automatically apply air pressure above speeds of five mph, Spicer Trailer Products does not approve, and will not warrant axles used on spread axle trailers equipped with dump valves."

Great Dane does not offer dump valves on spread-axle platforms for increasing maneuverability or reducing tire-scuffing. "We will put dump valves on both axles in order to control dock height, but we won't put them on just one axle," states Paul Crabtree, manager of engineering at Great Dane's platform plant in Memphis, Tenn. "We will put them on lift axles if a tandem is already in place, because we are assuming that the trailer will be operated with the axle lifted. The trailer will have to be built to handle that."

Clearly, these attempts by the prior art to solve problems associated with spread-tandem axles on eighteen-wheelers fall far short of providing satisfactory solutions to these problems.

A basic cause of both these problems is the use of axles with fixed wheels. Whether the axle is a fixed axle or a steerable axle, the axle is not adaptable to being steered without a significant amount of drag.

SUMMARY OF THE INVENTION

In general, the present invention in one aspect provides an extended motor vehicle with an improved steering system. The improvement comprises the addition of a second steering system which controls steerable wheels disposed aft of the front wheels.

In a first embodiment, the extended motor vehicle comprises an elongated, integral chassis including a frame, and a body including a motor mounted on the frame. A first pair of steerable wheels are rotatably mounted on spindles attached to opposite ends of a first fixed axle at the front end of the vehicle. A second pair of steerable wheels are rotatably mounted on spindles attached to opposite ends of a second fixed axle at the rear end of the vehicle. A pair of fixed wheels are rotatably mounted on opposite ends of a third fixed axle disposed between and spaced apart from the first and second axles. At least one of the second and third axles is a driving axle. A steering wheel determines the direction of motion of the motor vehicle. Means are provided for forcibly steering the steerable wheels in accordance with the orientation of the steering wheel and the geometry of the motor vehicle.

In a second embodiment, the motor vehicle comprises an elongated, integral chassis, and a body, which includes a motor, mounted on the chassis. A first pair of steerable wheels are rotatably mounted on spindles attached to opposite ends of a first fixed axle at the front end of the vehicle. A pair of fixed wheels are rotatably mounted on a second fixed axle at the rear end of the vehicle. A second pair of steerable wheels are rotatably mounted on spindles attached to opposite ends of a third fixed axle disposed between and spaced apart from the first and second axles. At least one of the second and third axles is a driving axle. A steering wheel determines the direction of motion of the motor vehicle. Means are provided for forcibly steering the steerable wheels in accordance with the orientation of the steering wheel and the geometry of the motor vehicle.

In a second aspect, the present invention provides as a first embodiment a trailer steered by remote control. The improvement comprises the addition of a second steering system which controls steerable wheels under the trailer. The trailer is supported by a plurality of steerable wheels pivotally connected to a first fixed axle near the rear end of the trailer, and by a plurality of fixed wheels mounted on a second fixed axle. The second axle is disposed approximately midway between the first axle and the longitudional center of the trailer. Means are provided for coupling the trailer to towing means, and for sensing the direction of motion of the towing means. Pneumatic means are provided for forcibly steering the steerable wheels supporting the trailer in accordance with the sensed direction of motion of the towing means, thereby steering the trailer by remote control.

In a second embodiment, the invention provides a stabilized tractor-trailer combination. The trailer is articulated to the tractor, which has a conventional fifth wheel. The trailer includes a plurality of steerable rear wheels pivotally connected to a first fixed axle, and a plurality of fixed wheels mounted on a second fixed axle. The second axle is disposed approximately midway between the first axle and the longitudional center of the trailer. A directional sensor disposed within the fifth wheel senses the direction of motion of the tractor, and the steerable wheels of the trailer are forcibly and pneumatically steered in accordance with the sensed direction of motion of the tractor.

BRIEF DESCRIPTION OF THE DRAWINGS

FIG. 1 is a schematic representation of a first embodiment of a prior-art extended motor vehicle.

FIG. 2 is a schematic representation of a second embodiment of a prior-art extended motor vehicle.

DETAILED DESCRIPTION OF THE INVENTION

Figure 3:
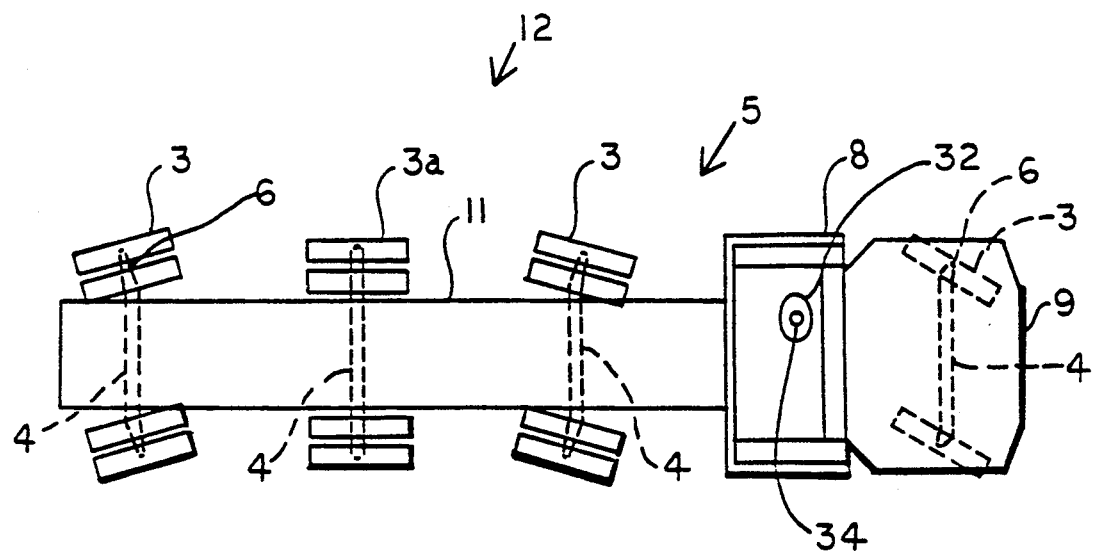
FIG. 3 is a schematic representation of a first embodiment of an extended motor vehicle made in accordance with the principles of the present invention.

More specifically, reference is made to FIG. 3, wherein is shown a first embodiment of an extended motor vehicle made in accordance with the principles of the present invention, and generally designated by the numeral 12.

The motor vehicle 12 comprises a chassis, generally designated by the numeral 5, which includes a frame 9. A body which includes a motor (not shown) and a cab 8 is mounted on the frame 9. Inside the cab 8 is a steering wheel 32 connected to a steering column 34. The body includes a seat for the driver, a front windshield, two side windows, and a hood disposed above the motor, none of which is shown in the drawing.

The frame 9 is mounted on first, second, third, and fourth fixed axles 4. The first axle 4 is located near the front end of the vehicle 12, and is equipped with two pairs of steerable wheels 3 mounted on spindles 6 attached to the axle 4. The second axle 4 is located near the rear end of the vehicle 12, and is provided with two pairs of steerable wheels 3 rotatably mounted on spindles 6 attached to opposite ends of the axle 4. The third axle 4 is disposed forward of the second axle 4, and is equipped with two pairs of fixed wheels 3a. The third axle 4 acts as a pivot when turns are made. The fourth axle 4 is disposed forward of the third axle 4, near the cab 8. The fourth axle 4 is equipped with two pairs of steerable wheels 3 on spindles 6 attached to opposite ends of the axle 4. Means for transmitting the direction of motion defined by the orientation of the steering wheel 32 and for forcibly steering the steerable wheels 3 in accordance with the orientation of the steering wheel 32 and the geometry of the extended vehicle 12 are provided, but are not shown in the drawing.

Figure 4:
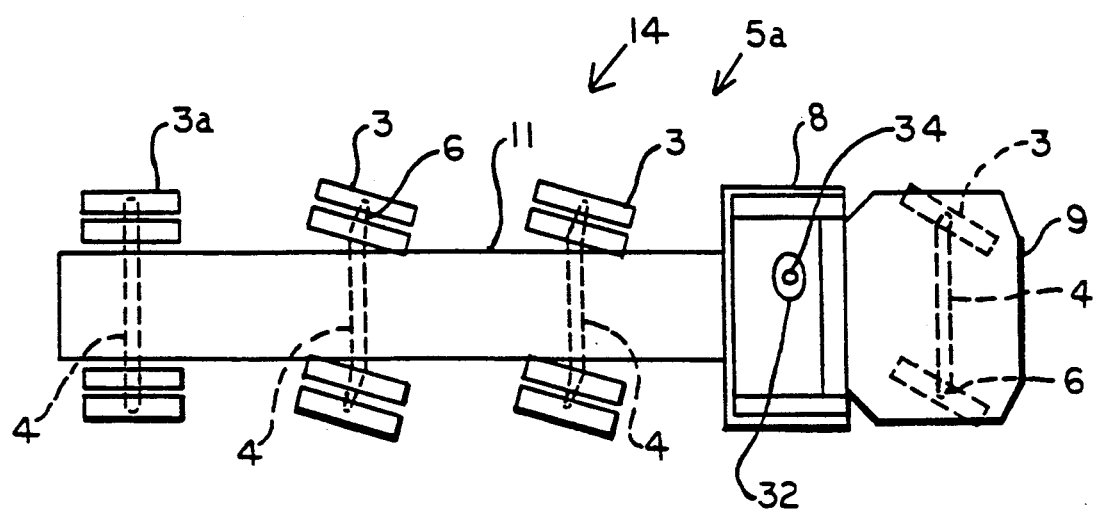
FIG. 4 is a schematic representation of a second embodiment of an extended motor vehicle made in accordance with the principles of the present invention.

Reference is now made to FIG. 4, in which is shown a second embodiment 14 of an extended motor vehicle made in accordance with the principles of the present invention.

The extended motor vehicle 14 comprises a chassis 5a and a body including a cab 8 mounted on a frame 9. The frame 9 is supported by first, second, third, and fourth fixed axles 4. The first axle 4 has steerable wheels 3, and is situated near the front end of the vehicle 14. The second axle 4 is near the rear end of the vehicle 14, and is equipped with fixed wheels 3a. The third axle 4, which is equipped with steerable wheels 3, is disposed forward of the second axle 4. The fourth axle 4, which has two pairs of steerable wheels 3, is disposed between the third axle and the first axle, near the cab 8. A steering wheel 32 directs the motion of the vehicle, and means (not shown) are provided for transmitting the direction of motion defined by the orientation of the steering wheel 34 to the steerable wheels 3, and for forcibly steering the wheels 3 in accordance with the orientation of the steering wheel 32 and the geometry of the extended vehicle 14.

Figure 5:
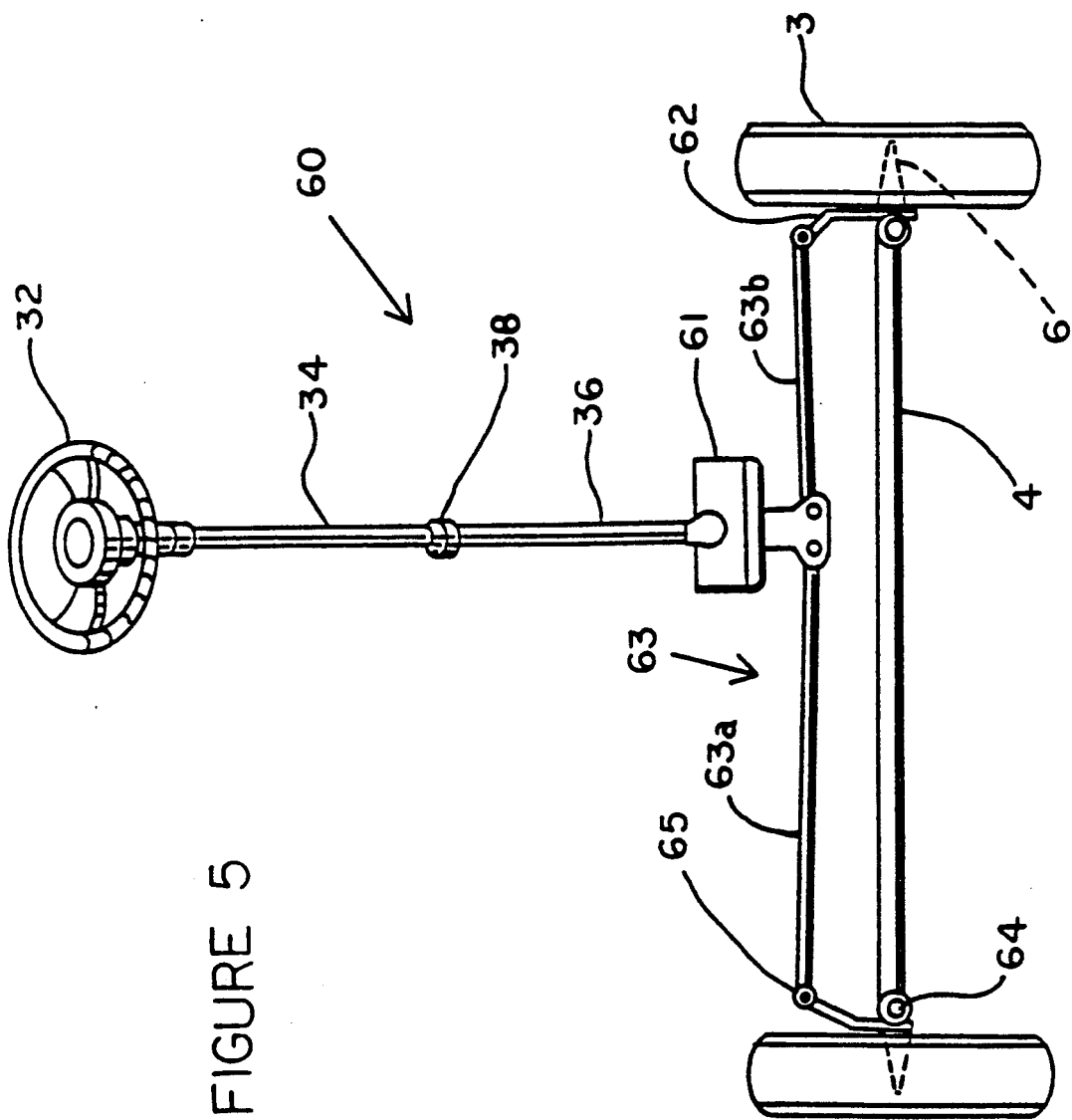
FIG. 5 is a schematic representation of a conventional prior-art steering system for an automobile, pickup truck, or light extended motor vehicle.

Reference is now made to FIG. 5, in which is shown a conventional prior-art steering system adapted particularly for automobiles, pickup trucks, and other non-extended vehicles, and generally designated by the numeral 60. This system 60 can also be modified, in the case of the present invention, to connect the steering shaft 36 to steerable wheels 3 mounted on a fixed axle 4 supporting the frame of an extended vehicle.

The steering system 60 comprises a steering wheel 32, a steering column 34, a steering shaft 36, a universal joint (U-joint) 38 connecting the steering shaft 36 to the steering column 34, a steering-gear box 61, tie rods 63a, 63b, steering arms 62, ball joints 65, king pins 64, spindles 6, and steerable wheels 3.

The steering system 60 can be assisted by a power booster (not shown), thereby providing power-steering for the vehicle. The principal components of the power booster are a control valve, a power actuator, and a source of power. As the vehicle follows a course determined and controlled by the steering system 60, the control valve senses any deviation from the prescribed position of the steerable wheels 3, and releases power to the actuator until the deviation has been corrected.

Figure 6:
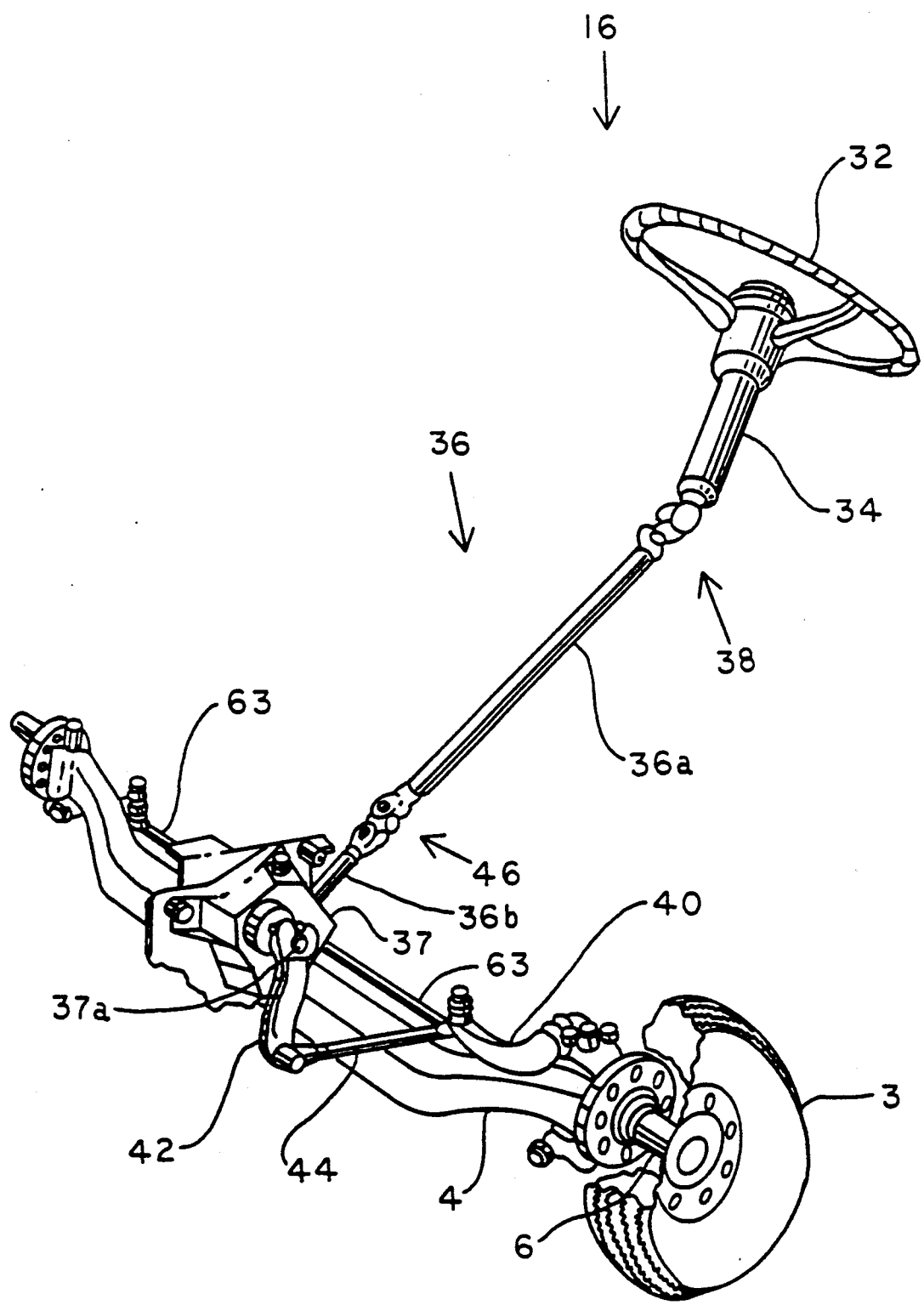
FIG. 6 is a schematic representation of a prior-art steering system for an extended motor vehicle.

Reference is now made to FIG. 6, in which is shown a prior-art system for steering a front pair of steerable wheels supporting the front end of an extended motor vehicle, the system being generally designated by the numeral 16.

The steering system 16 comprises a steering wheel 32, a steering column 34, a steering shaft 36 comprising upper and lower segments 36a and 36b, respectively, a first U-joint 38 connecting the upper segment 36a of the steering shaft 36 to the steering column 34, a second U-joint connecting the upper and lower segments of the steering shaft 36 to one another, a steering-gear box 37, a Pitman arm 42, a drag link 44, a steering arm 40, a tie rod 63, and steerable wheels 3 rotatably mounted on spindles 6.

Figure 7:
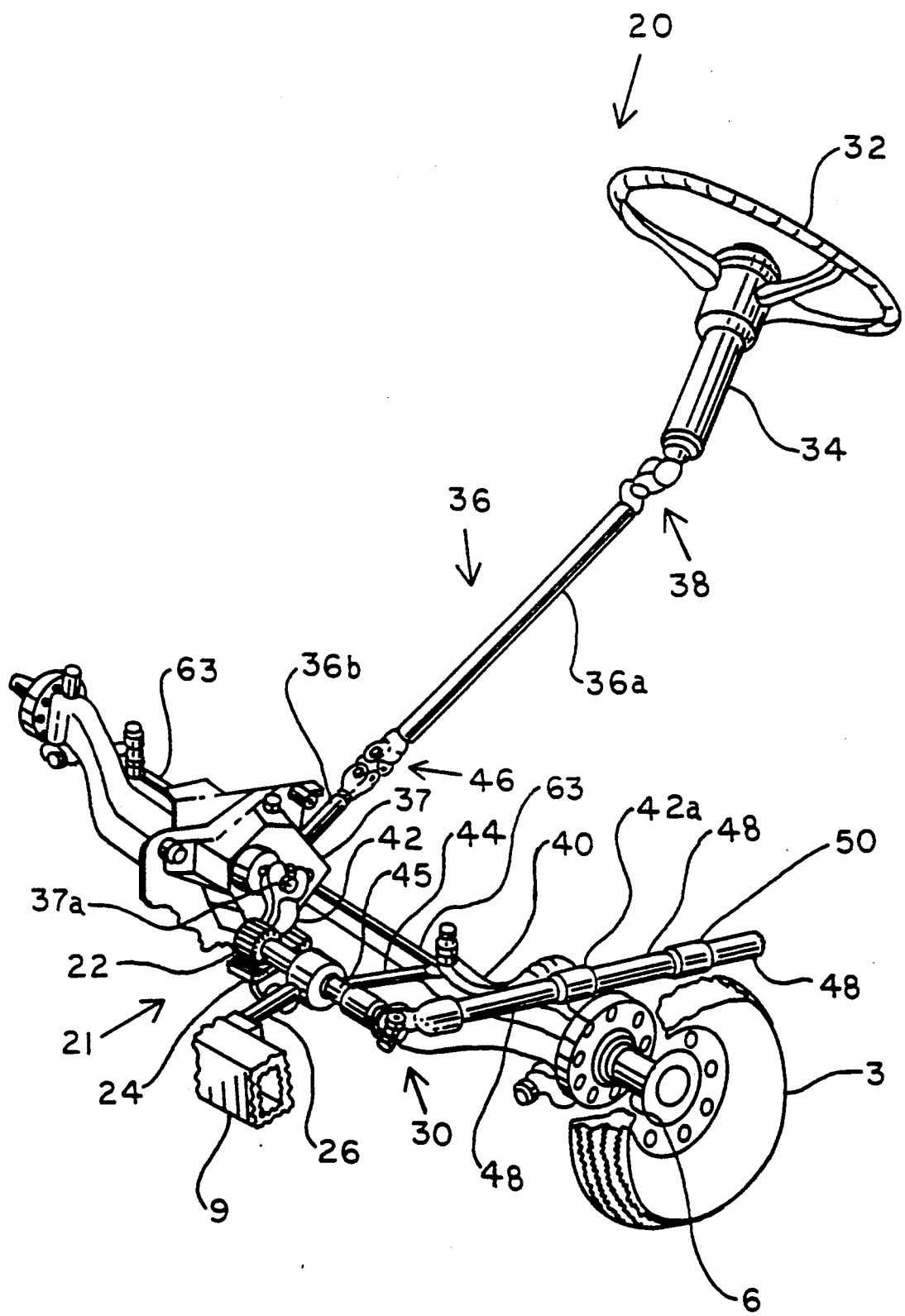
FIG. 7 is a schematic representation of the front end of a first embodiment of a steering system for an extended motor vehicle, made in accordance with the principles of the present invention.
Figure 8:
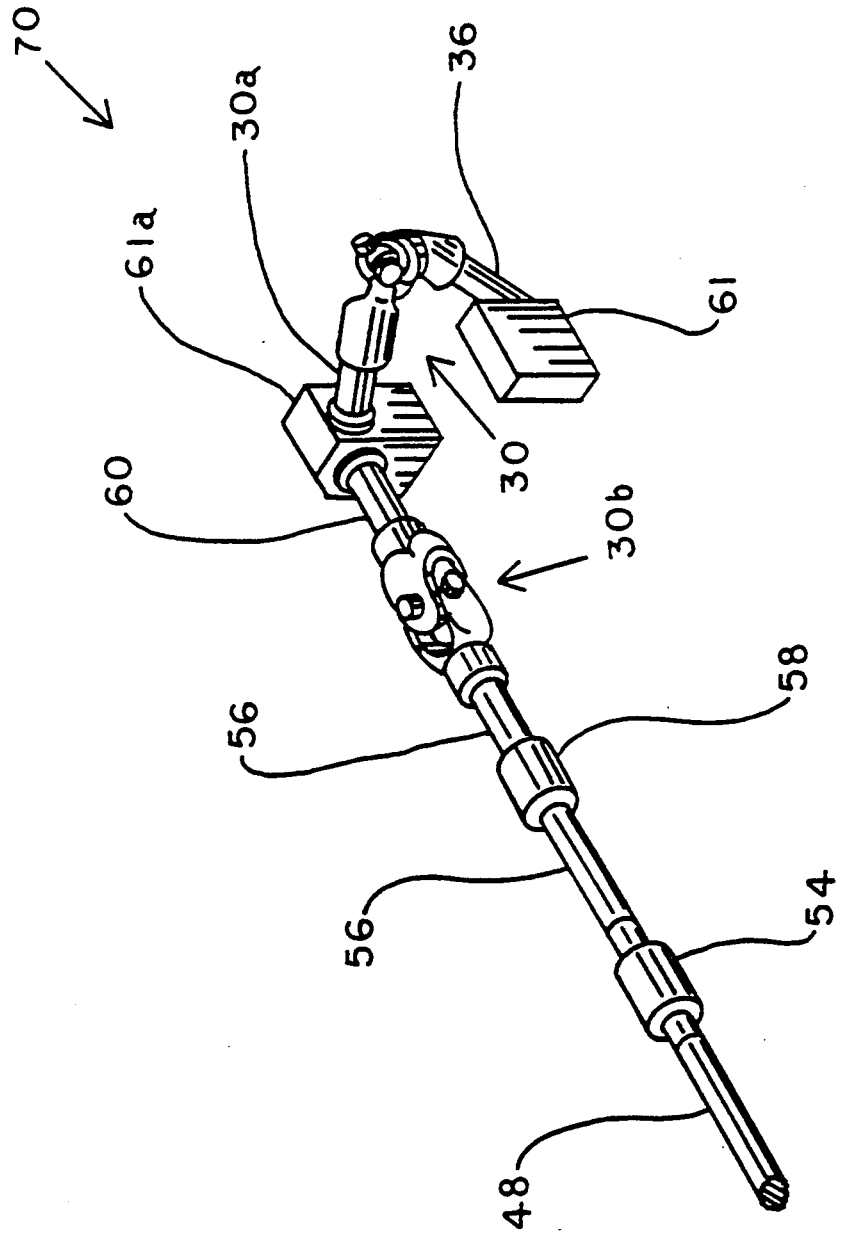
FIG. 8 is a schematic representation of the rear end of a first embodiment of a steering system for an extended motor vehicle, made in accordance with the principles of the present invention.

Reference is now made to FIGS. 7 and 8, which show the front end 20 and rear end 70 of a first embodiment of a steering system for an extended motor vehicle, made in accordance with the principles of the present invention.

The steering system 20, 70 comprises a steering wheel 32, a steering column 34 connected to the steering wheel 32, first and second segments 36a and 36b of a steering shaft 36, a first U-joint 38 connecting the steering column 34 to the first segment 36a of the steering shaft 36, a second U-joint 46 connecting the first and second segments 36a and 36b of the steering shaft 36 to one another, and a steering-gear box 37 connected to the second segment 36b of the steering shaft 36.

A circular first gear 22 engages an arcuate second gear 24 mounted on the Pitman arm 42 by a short shaft 37a fastened to the Pitman arm 42. The first and second gears 22 and 24 form, in combination, a mechanical sensor 21 for detecting the orientation of the steering shaft 36, and thereby the orientation of the steering wheel 32.

For steering the front steerable wheels 3, the Pitman arm 42 is connected to the spindle 6 by means of a drag link 44 and a steering arm 40, just as in the prior-art system 16 shown in FIG. 6.

Steerage of the steerable wheels 3 aft of the front pair of wheels 3 requires a power train. The front end of the power train comprises a first shaft 45, one end of which terminates in the first gear 22. The other end of the first shaft 45 is connected to a second shaft 48 by a third U-joint 30. Between the first gear 22 and the U-joint 30 the first shaft 45 is fastened by a bracket 26 to the frame 9.

The first and second shafts 45 and 48 are substantially perpendicular to one another.

The second shaft 48 is provided with first and second bushings 42a, 50. The second shaft 48 is connected to a third shaft 56 by a spline 54. The third shaft 56 is provided with a third bushing 58. A fourth U-joint 30b connects the third shaft 56 to a fourth shaft 60. The second, third, and fourth shafts 48, 56, and 60, respectively, are substantially colinear.

The spline 54 prevents relative rotary movement of the shafts 48 and 56 while permitting longitudional movement thereof. The bushings 42a, 50, and 58 stabilize the shafts 48 and 56, and limit the movements of the shafts in any direction except longitudionally. The U-joints 30 and 30b allow and compensate for non-colinearity of the shafts 48, 56 and 60.

The fourth shaft 60 is coupled to a second steering shaft 36 by a second gear box 61a, a short shaft 30a, and a fifth U-joint 30. The second steering-gear box 61a communicates with a third steering-gear box 61 through the second steering shaft 36. The third gear box 61 controls a second Pitman arm 42 (not shown), which forcibly steers the steerable wheels 3 rotatably mounted on spindles 6 connected to a fixed axle 4 aft of the cab 8 (FIGS. 3 and 4). If, as shown in FIGS. 3 and 4, there are two axles 4 with steerable wheels 3 aft of the cab 8, then the system just described would branch at the second gear box 61a to two second steering shafts 36, one shaft 36 for each set of steerable wheels 3.

Figure 9:
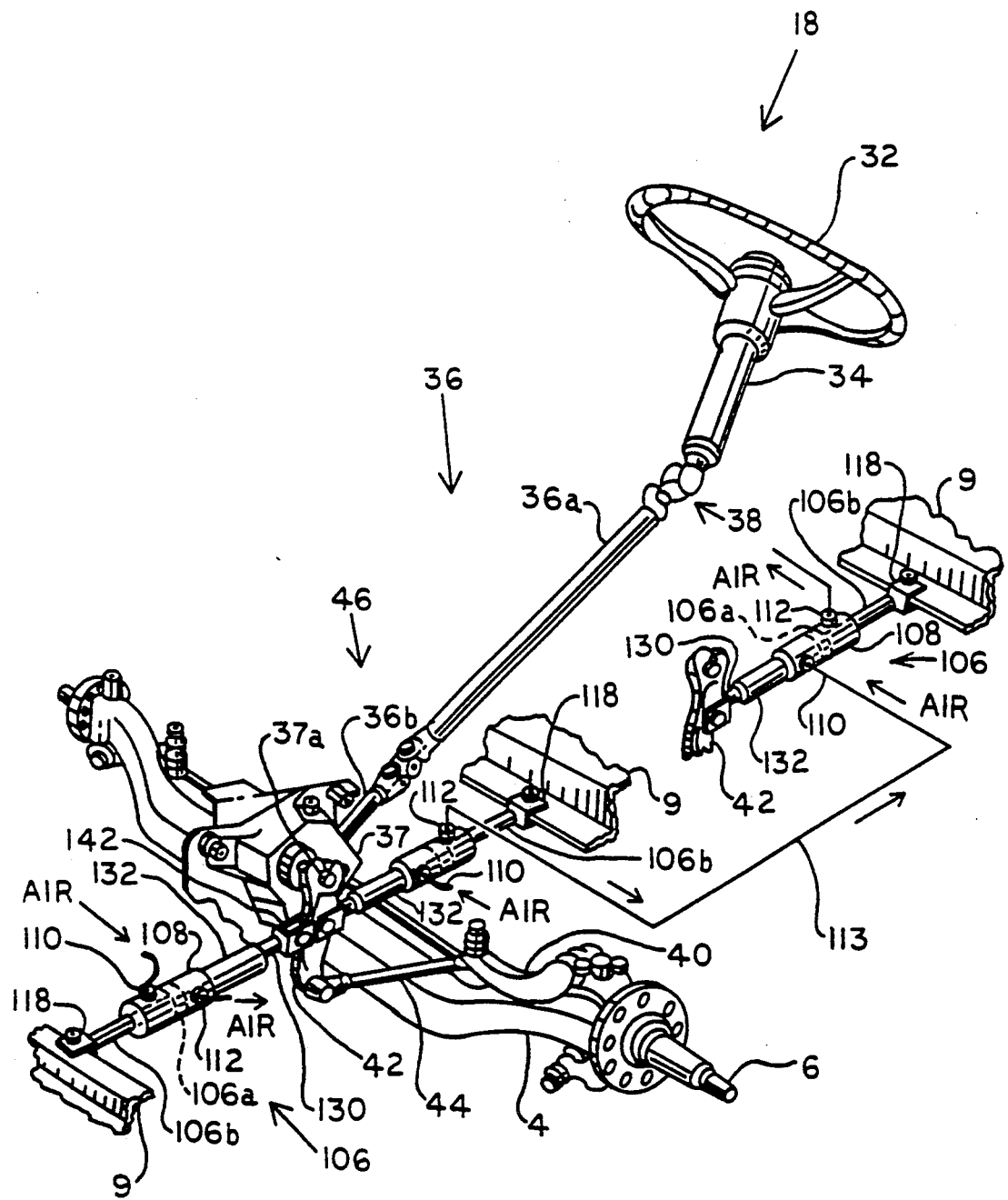
FIG. 9 is a schematic representation of a second embodiment of a steering system for an extended motor vehicle, made in accordance with the principles of the present invention.

Reference is now made to FIG. 9, in which is shown a first part of a second embodiment of a steering system for an extended motor vehicle, made in accordance with the principles of the present invention, and generally designated by the numeral 18.

The steering system 18 comprises a steering wheel 32, a steering column 34, a steering shaft 36 comprising first and second segments 36a, 36b, a first U-joint 38 connecting the steering column 34 to the first segment 36a of the steering shaft 36, a second U-joint 46 connecting the first and second segments 36a, 36b of the steering shaft 36 to one another, and a gear box 37 connecting the second segment 36b of the steering shaft 36 to a Pitman arm 42.

Attached to the forward side of the Pitman arm 42 by a bracket 118 is a stem 130, which is disposed in a sleeve 132 and freely moves therein. The sleeve 132 is fastened to a cylinder 108 provided with one-way (single-direction) inlet and outlet valves 110 and 112, respectively. Disposed within the cylinder 108 is a piston head 106a and a portion of a piston rod 106b, the other portion of the piston rod 106b being fastened to the frame 9 of the motor vehicle by a bracket 118. The piston head 106a and piston rod 106b in combination comprise a piston 106.

Forward movement of the Pitman arm 42 causes a corresponding movement of the stem 130 in the sleeve 132 until the Pitman arm 42 contacts the sleeve 132, at which time the Pitman arm 42 causes the sleeve 132 and thereby the cylinder 108 to move correspondingly. This movement compresses the air in the cylinders 108 and forces the air out of the cylinder 108 through the outlet valve 112. When the Pitman arm 42 moves in the opposite direction, air is drawn into the cylinder 108 through the inlet valve 110.

The aft side of the Pitman arm 42 is connected by a second bracket 118 to a second stem 130, sleeve 132, piston 106 and cylinder 108. A second piston rod 106b is fastened to the frame 9 of the vehicle.

Aft of the second stem 130, cylinder 108, and piston 106 is disposed a second Pitman arm 42, pivotally mounted on a second short shaft 37a. The aft side of the second Pitman arm 42 is connected by a third bracket 118 to a third combination of a third stem 130, third sleeve 132, third cylinder 108, and third piston 106, the third piston rod 106b being fastened to the frame 9 of the vehicle by a fourth bracket 118.

As shown in the drawing, air enters each cylinder 108 through an inlet valve 110, and leaves the cylinder 108 through an exit valve 112.

Figure 15:
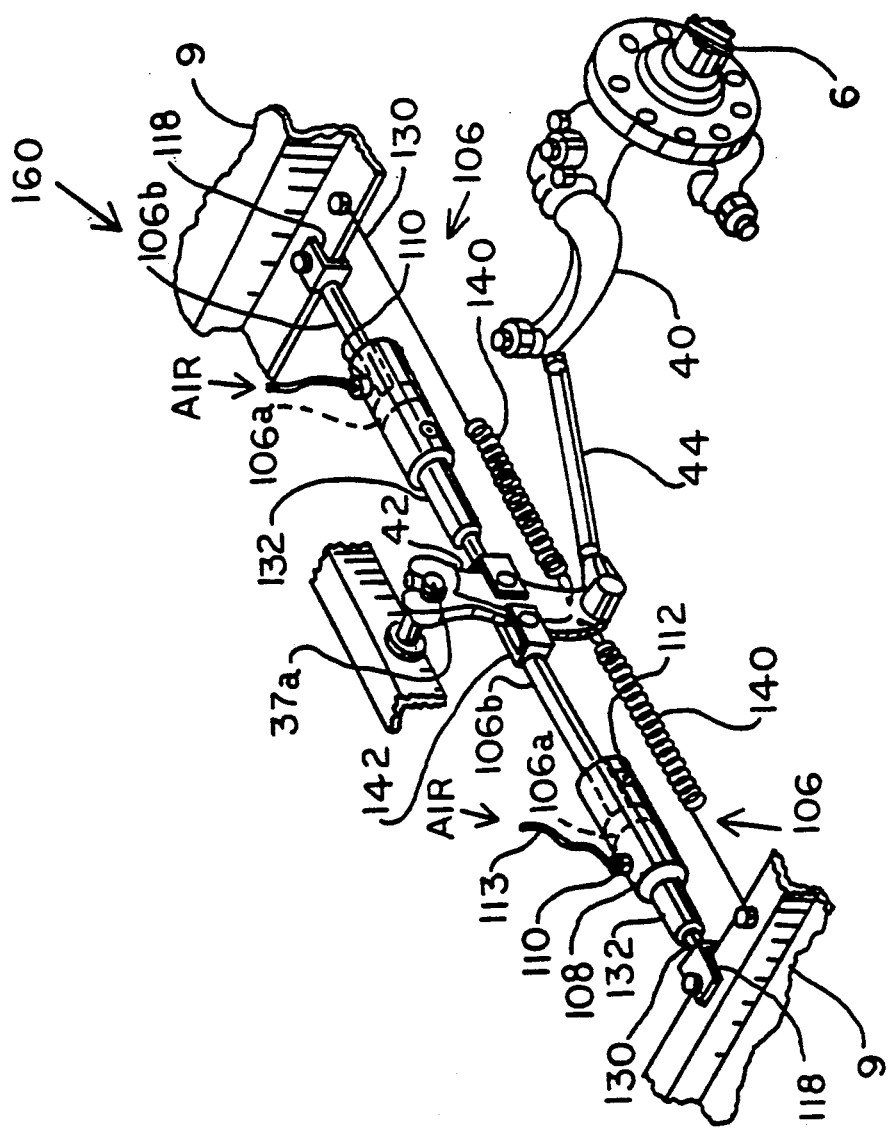
FIG. 15 is a schematic representation of the aft section of the system shown in FIG. 14, and of the second part of the steering system shown in FIG. 9.

Reference is now made to FIG. 15, in which is shown a second part of the second embodiment 18. The second Pitman arm 42 is connected on each side thereof by brackets 118 to third and fourth stems 130, sleeves 132, cylinders 108, and pistons 106. A pair of springs 140 are also connected to the two sides of the Pitman arm 42. The springs 140 are of equal tension. Either spring 140 will overcome the air pressure in the cylinders 108, and bring the Pitman arm 42 to home position.

The steering system 18 operates in the following manner.

When the operator of the extended motor vehicle 12 (FIG. 3) or 14 (FIG. 4) starts to make a turn, he or she turns the steering wheel 32 clockwise or counterclockwise. This turning of the steering wheel 32 causes a corresponding rotation of the steering column 34 and of the steering shaft 36. The second segment 36b of the steering shaft 36 engages gears in the gear box 37, whereby the short shaft 37a is rotated accordingly. The first Pitman arm 42 is rigidly fastened to the shaft 37a, whereby the first Pitman arm 42 is caused to move in a forward or in a reverse direction. Movement of the first Pitman arm 42 causes corresponding forward or reverse motion of the first and second stems 130 within the first and second sleeves 132. Said movement of the first and second stems 130 continues until the first Pitman arm 42 contacts the end of a sleeve 132.

The cylinder 108 then moves forward or backward in response to force applied by the Pitman arm 42. The motion of the cylinder 108 causes compression or expansion of the air within the cylinder, whereby air enters or leaves the cylinder 108 through inlet and outlet valves 110 and 112, respectively, and connecting hoses 113 from the first and second cylinders 108 to the third and fourth cylinders 108. The third and fourth cylinders 108 in combination with the third and fourth sleeves 132, stems 130, and pistons 106 then force the second Pitman arm 42 to move in a forward or reverse direction by pivoting on the second short shaft 37a in response to the motion of the third cylinders 108 and sleeves 132 fastened thereto. The motion of the second Pitman arm 42 is transmitted to the second steering arm 40 by the second drag link 44. The spindles 6 and the steerable wheels 3 mounted thereon are thus forcibly steered by the second steering arm 40.

Figure 10:
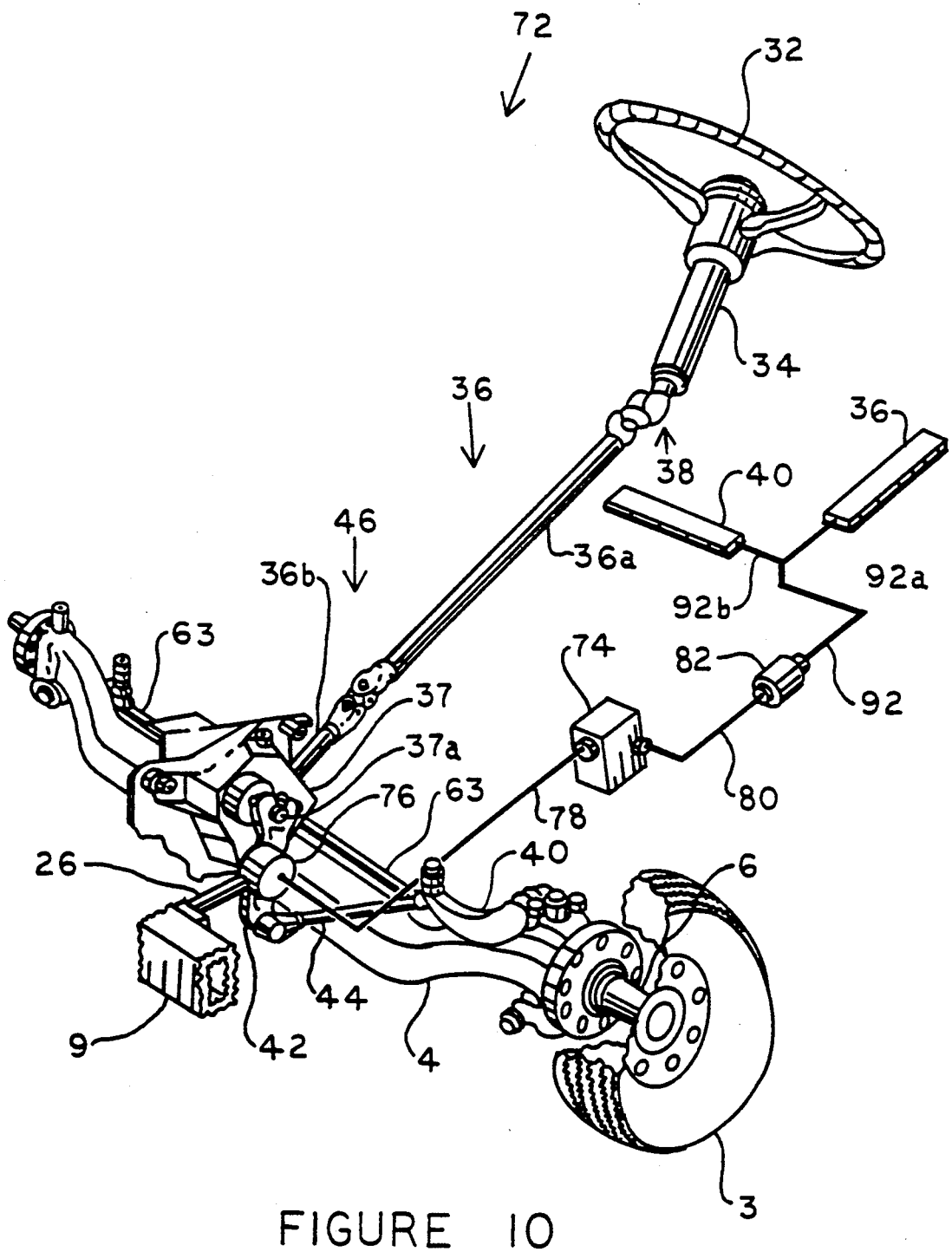
FIG. 10 is a schematic representation of a third embodiment of a steering system for an extended motor vehicle, made in accordance with the principles of the present invention.

Reference is now made to FIG. 10, in which is shown a third embodiment of a steering system for an extended motor vehicle, made in accordance with the principles of the present invention, and generally designated by the numeral 72.

The steering system 72 comprises a steering wheel 32, a steering column 34, a steering shaft 36 comprising first and second segments 36a, 36b, a first U-joint connecting the steering column 34 to the first segment 36a of the steering shaft 36, a second U-joint 46 connecting the first and second segments 36a, 36b of the steering shaft 36 to one another, and a gear box 37 connecting the second segment 36b of the steering shaft 36 to a Pitman arm 42.

Attached to the Pitman arm 42 is an electrical sensor 76. The sensor 76 is fastened to the frame 9 of the extended motor vehicle 12 (FIG. 3) or 14 (FIG. 4). The sensor 76 senses the orientation of the steering wheel 32 by sensing the position of the Pitman arm 42. How this is done will be better understood by reference to FIG. 11.

Figure 11:
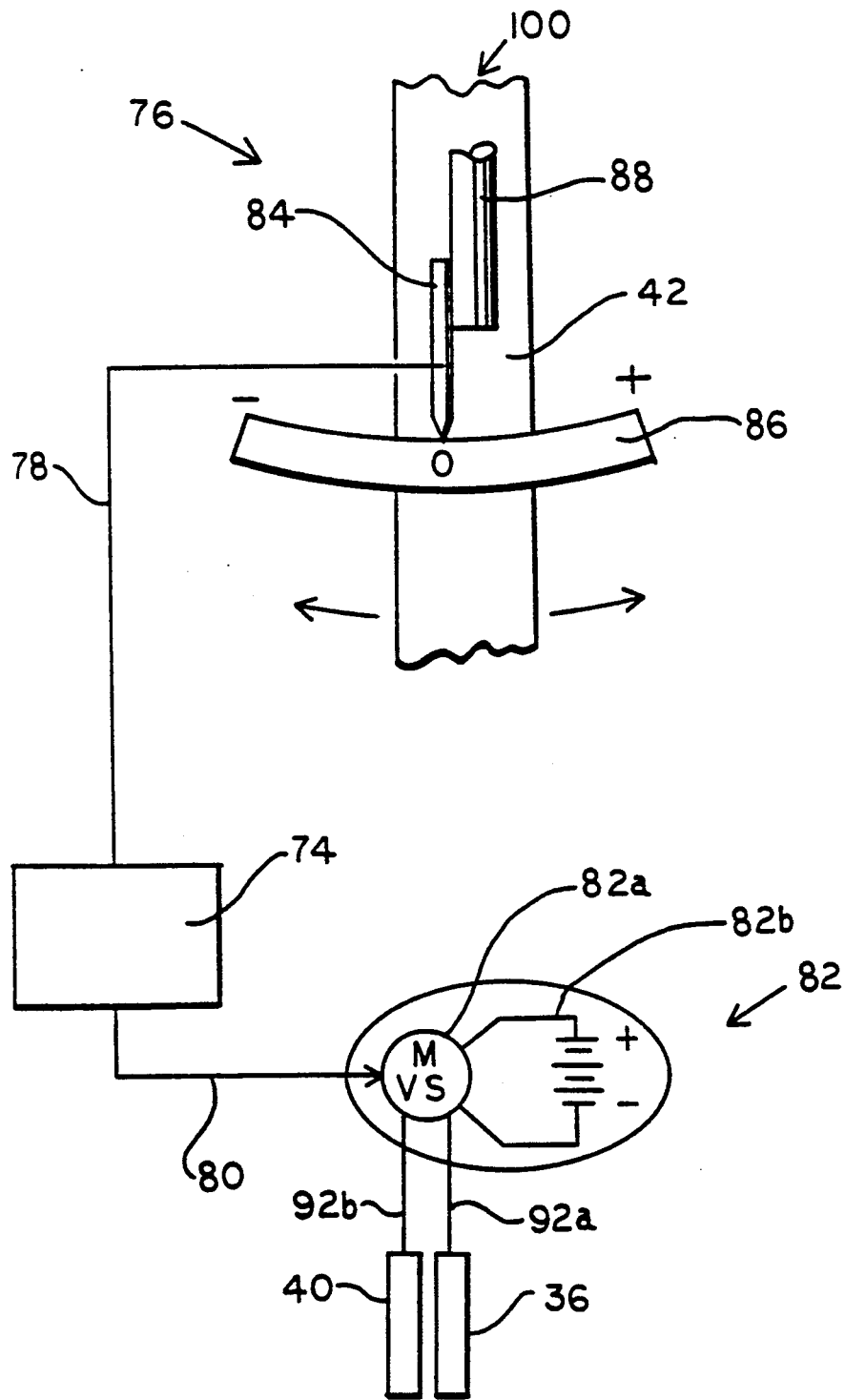
FIG. 11 is a schematic representation of the detailed structure of some of the elements of the steering system shown in FIG. 10.

The detailed structure of some of the elements included in the third embodiment 72 of a steering system for an extended motor vehicle is shown in FIG. 11, which detailed representation is generally denoted by the numeral 100.

The assemblage 100 comprises an electrical sensor 76 which includes a shaft 88 fastened to the Pitman arm 42. A pointer 84 attached to the shaft 88 makes electrical contact with a source 86 of varying electrical potential. The potential sensed by the pointer 84 depends upon the orientation and position of the Pitman arm 42, which in turn depends upon the orientation of the steering wheel 32. The electrical potential of the source 86 need not, but preferably does vary from a maximum positive value at one end of the source 86 range to a maximum negative value at the other end of the range, with the middle of the range having substantially zero potential. The pointer 84 tapers to a point at the end of the pointer which contacts the source of electrical potential 86, in order the better and more accurately to read the electrical potential and thereby sense and define the position and orientation of the steering wheel 32. The source 86 of varying electrical potential need not but preferably is of a substantially semicircular design.

As the steering wheel 32 is turned from a "straight forward" position to make a turn, the Pitman arm 42, shaft 88, and pointer 84 move to the right or to the left, thereby contacting a more positive or a more negative potential. The potential sensed is transmitted via a first wire 78 to a microprocessor 74, which is programmed to receive a first signal indicative of the position of the Pitman arm 42 as sensed by the sensor 76, and to transmit a second signal by a second wire 80 to a servomechanism 82 which controls the steering shaft 36 or the steering arm 62 or 40 of the steering systems shown in FIGS. 5 and 7. Connection with the steering shaft 36 is via a connecting member 92a. Connection with the steering arm 62 or 40 is by a connecting member 92b.

The nature of the members 92a, 92b depends upon the type of servomechanism 82 that is employed. The servomechanism 82 may utilize hydraulic pressure, pneumatic pressure, or electrical power. As illustrated in FIG. 11, the servomechanism 82 includes an electric motor 82a. The electric motor 82a is preferably a variable-speed, reversible motor. Power for operating the motor 82a may be provided, for example, by an electric battery 82b. Alternatively, the electric power may be provided, for example, by an electric generator (not shown) which is part of the equipment carried by or on the vehicle 12 (FIG. 3) or the vehicle 14 (FIG. 4).

The motor 82a is responsive to the signal received from the microprocessor 74. More specifically, the signal transmitted by the microprocessor 74 to the servomechanism 44 controls the speed and direction of rotation of the rotor (not shown) in the motor 82a. The motor 82a controls the steering shaft 36 or the steering arm 40, 62, which causes the wheels 3 to turn in accordance with the orientation and position of the steering wheel 32 as sensed by the sensor 76, and with the particular geometry of the vehicle 12 or 14.

Upon receiving the signal from the sensor 76, the microprocessor 74 sends a second signal to the servomechanism 82. The second signal is likewise indicative of the orientation and position of the steering wheel 32, and includes information as to the geometry of the vehicle 12 or 14.

Either signal or both signals may be transmitted electrically or by radio. Electrical transmission comprises the use of an electrical conductor. If either signal is, or if both signals are transmitted by radio waves, the transmission system includes, for each signal, a modulator, a transmitter, a demodulator, and a receiver (not shown). The direction of displacement of the radio wave from the null plane indicates the position of the steering wheel 32, and the amplitude of the wave indicates the rate of motion of the vehicle 12 or 14.

The concepts and embodiments hereinabove disclosed for extended motor vehicles can be applied also to articulated towing-towed vehicles such especially as tractor-trailers or eighteen-wheelers. The remainder of the present application relates to such combinations.

Figure 14:
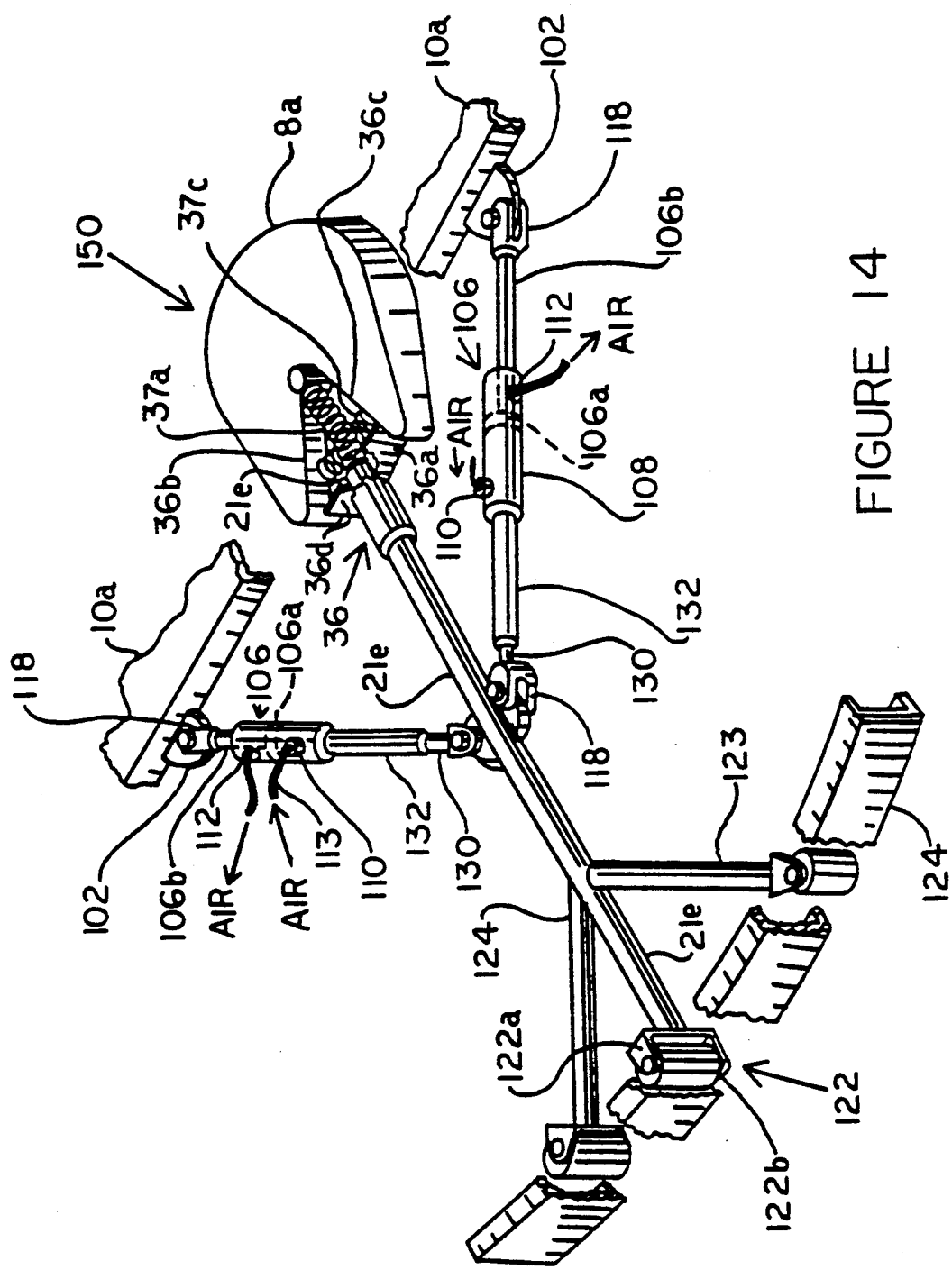
FIG. 14 is a schematic representation of the forward section of a pneumatic steering system for the remote steering of a trailer articulated to a tractor, made in accordance with the principles of the present invention.

Reference is now made to FIG. 14, in which is shown the forward section of a pneumatic steering system for the remote steering of a trailer articulated to a tractor, made in accordance with the principles of the present invention, and designated generally by the numeral 150.

Figure 12:
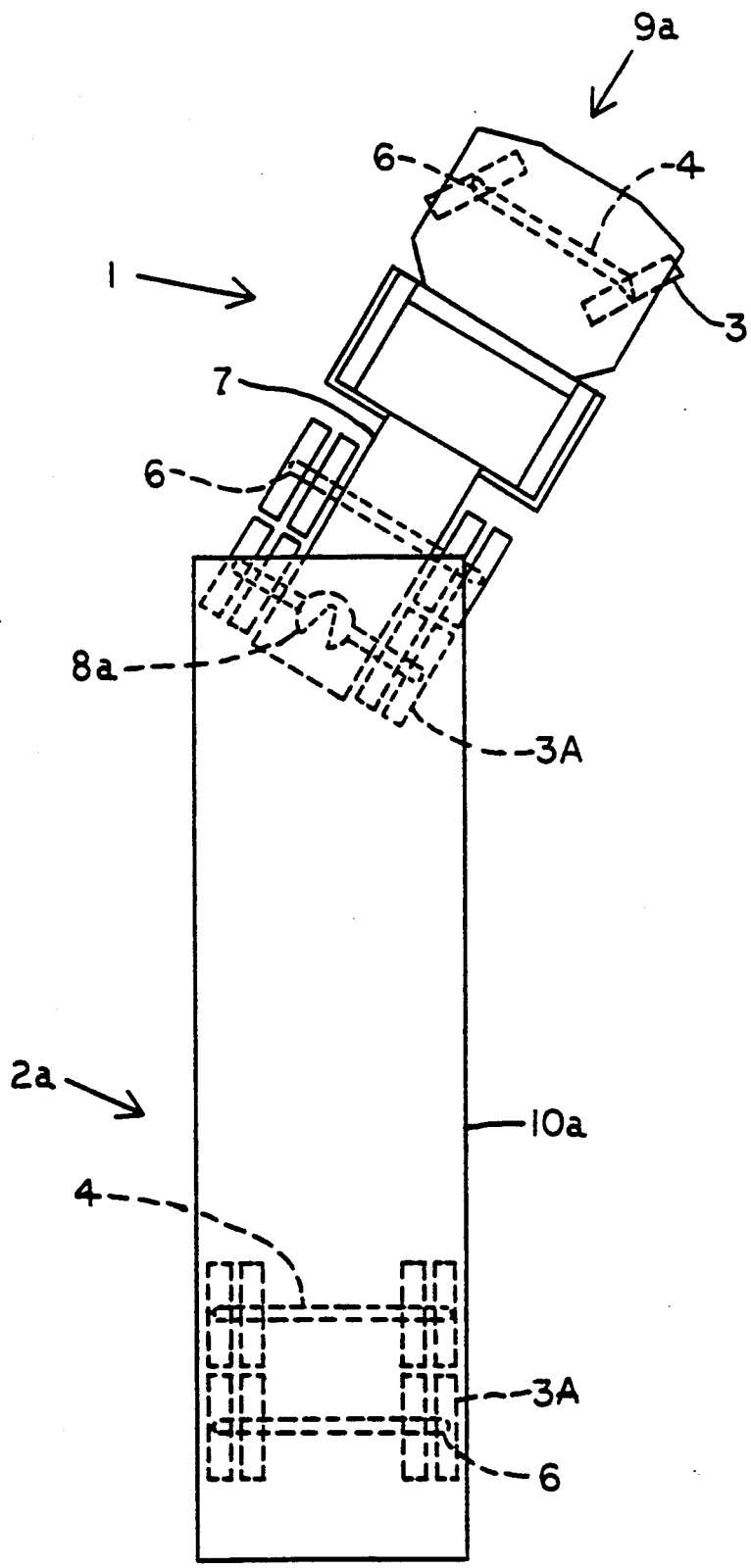
FIG. 12 is a plan view, partly schematic, of a prior-art eighteen-wheeler with tandem axles.
Figure 13:
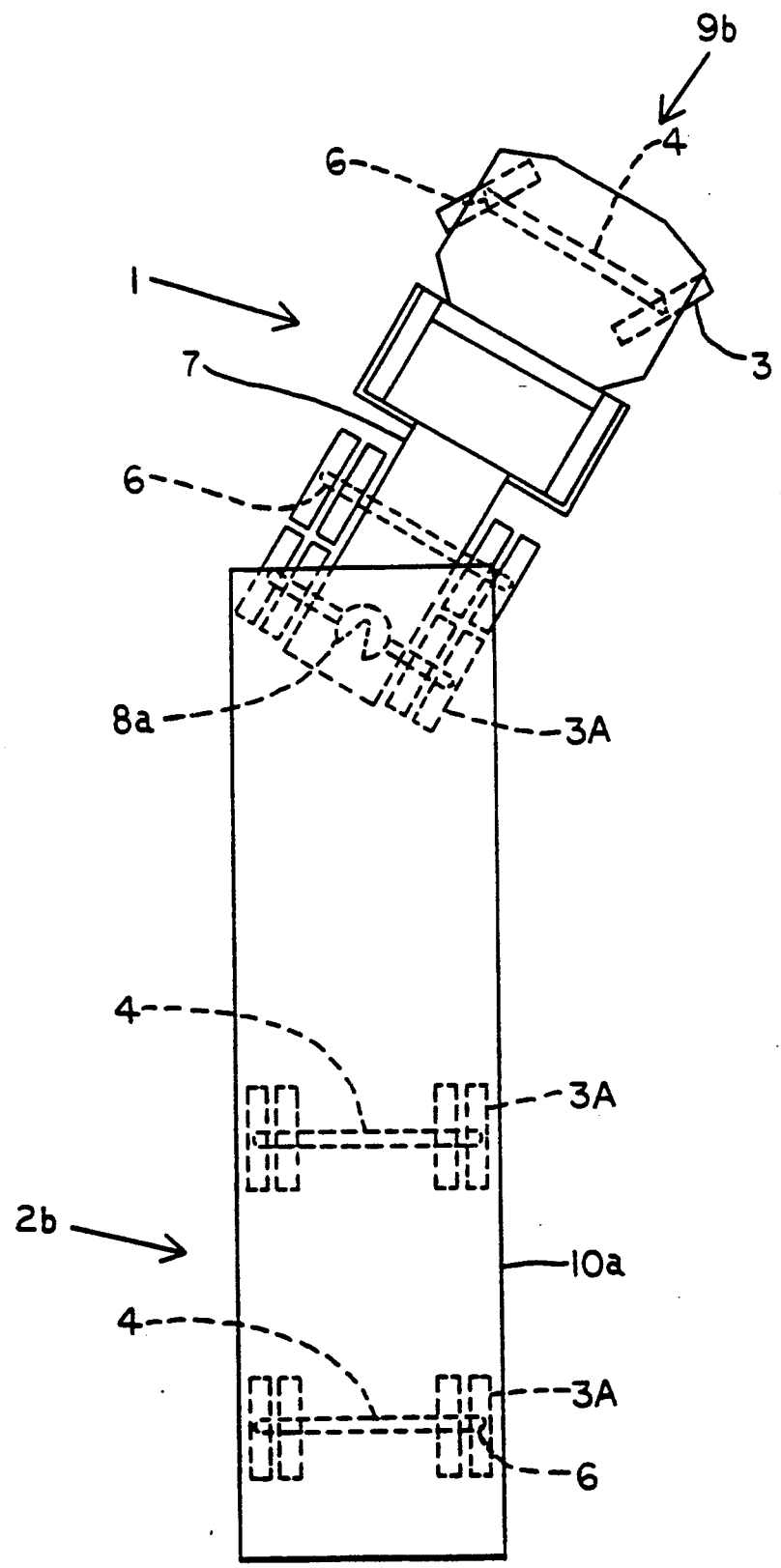
FIG. 13 is a plan view, partly schematic, of a prior-art eighteen-wheeler with spread-tandem axles.

The pneumatic steering system 150 utilizes a directional sensor 50a which is nested in the V slot of a fifth wheel 8a of a tractor 1 (FIGS. 12 and 13). The sensor 50a comprises an elongated passageway 36 which is closed at one end. Disposed in the elongated passageway 36 is a rigid, straight, elongated member 21e one end of which is fastened to three roller-connections 122. Each roller-connection 122 comprises a bracket 122a and a roller 122b. The rollers 122b roll in an arcuate channel 124. Two of the roller-connections 122 are connected to the rod 21e by members 123; the third roller-connection 122 is disposed between the other two roller-connections 122, and is connected directly to the rod 21e.

Laterally connected to the rod 21e by brackets 118 are first and second stems 130, first and second sleeves 132, first and second cylinders 108, and first and second pistons 106. Each piston 106 comprises a piston head 106a and a piston rod 106b. One end of each piston rod 106b is fastened to the frame 10a of the trailer 2a (FIG. 12) or 2b (FIG. 13). The pistons 106, cylinders 108, sleeves 132, and stems 130 are of the same structure and perform the same functions as the pistons 106, cylinders 108, sleeves 132, and stems 130 disclosed above for the extended motor vehicles 12 (FIG. 3) and 14 (FIG. 4).

The sensor 50a is spring-loaded against the channel 124, which is rigidly fastened to the underside of the trailer 2a (FIG. 12) or 2b (FIG. 13), by a first spring 37a, and against the inner slotted surface of the fifth wheel 8a by a second spring 37c.

The sensor 50a further comprises first and second compartments 49c and 49d. The first compartment 49c is defined by a vertical wall 36c and a lower horizontal flap 36a, as well as by an upper horizontal flap (not shown), and by the elongated passageway 36. The second compartment 49d is defined by a vertical wall 36b and a lower horizontal flap 36c, as well as by an upper horizontal flap (not shown), and by the elongated passageway 36. The upper and lower horizontal flaps are dimensioned such that the upper and lower flaps assignable to each compartment 49c, 49d can and do slide past one another, and partially overlap the upper and lower flaps of the corresponding and opposite compartment. The second spring 37c may beneficially provide support for the passageway 36, or independent support means may connect the passageway 36 to one of the walls 36b,c. The walls 36b and 36c are biasedly and resiliently connected to one another by the second spring 37c.

Reference is now made to FIG. 15, previously described, which represents the aft section, generally designated 160, of the steering system 150, the frame 9 of the extended vehicle 12 (FIG. 3) or 14 (FIG. 4) being understood in the present description as representing the frame 10a of the trailer 2a (FIG. 12) or 2b (FIG. 13). The functioning of the system 160 is identical to that previously described with reference to extended motor vehicles 14, 14 in connection with FIG. 9. The systems 150 and 160 comprise in combination a pneumatic steering system for tractor-trailer combinations and the like.

More specifically, the rearmost fixed wheels 3a on the trailer 2b shown in FIG. 13 are replaced with steerable wheels 3. The result is a first embodiment of a tractor-trailer combination made in accordance with the principles of the present invention. The first embodiment comprises a tractor 1 including a fifth wheel 8a, a directional sensor 50a nested in the V slot of the fifth wheel 8a, a trailer 2b supported by two pairs of steerable wheels 3 rotatably mounted on spindles 6 connected to a first fixed axle near the rear of the trailer 2b, and by two pairs of fixed wheels 3a mounted on spindles 6 connected to a second fixed axle near the longitudional center of the trailer 2b. The steerable wheels 3 at the rear of the trailer 2b are forcibly steered by the pneumatic steering systems 150, 160 in accordance with the direction of motion sensed by the sensor 50a.

In a second embodiment, a third axle 4 is provided the trailer 2b, the third axle disposed near the front end of the trailer 2b. Two pairs of steerable wheels 3 are mounted on spindles 6 connected to the third axle 4. The wheels 3 mounted on the third axle 4 are forcibly and pneumatically steered in accordance with the direction of motion sensed by the directional sensor 50a, using the steering systems 150, 160.

In a third embodiment, the fixed wheels 3a on the second fixed axle 4 near the center of the trailer 2b are replaced by steerable wheels 3, which are forcibly and pneumatically steered by the systems 150, 160 in accordance with the direction of motion sensed by the directional sensor 50a.

A fourth embodiment provides a trailer with a first fixed axle 4 having two pairs of fixed wheels 3a at the rear, a second fixed axle 4 with two pairs of steerable wheels 3 near the front end of the trailer, and a third fixed axle 4 with two pairs of steerable wheels 3 disposed near the longitudional center of the trailer. The steerable wheels 3 are forcibly and pneumatically steered by the systems 150, 160 in accordance with the direction of motion sensed by the directional sensor 50a.

A fifth embodiment provides a trailer with a first fixed axle 4 having two pairs of steerable wheels 3 near the rear of the trailer, a second axle with steerable wheels 3 near the front end of the trailer, and a third fixed axle having two pairs of fixed wheels 3a near the longitudional center of the trailer. The steerable wheels 3 are forcibly and pneumatically steered by the steering system 150, 160 in accordance with the direction sensed by the directional sensor 50a.

A sixth embodiment provides a trailer having a first fixed axle 4 with fixed wheels 3a near the rear of the trailer, and a second fixed axle 4 with two pairs of steerable wheels 3 near the front end of the trailer. The steerable wheels 3 are forcibly and pneumatically steered by the steering system 150, 160 in accordance with the direction of motion sensed by the directional sensor 50a.

In a seventh embodiment, a mechanical power train is used to provide a connection between the fifth wheel 8a of a tractor 1 and steerable wheels 3 mounted on a first fixed axle 4 near the rear of the trailer 2b. The trailer 2b is further supported by two pairs of fixed wheels 3a mounted on spindles 6 connected to a second fixed axle near the longitudional center of the trailer 2b. A directional sensor 50a is nested in the V slot of the fifth wheel 8a. Thus the fifth embodiment resembles the first embodiment except for the mechanism by which the direction of motion sensed by the directional sensor 50a is transferred to the steerable wheels 3 near the rear of the trailer 2b.

A mechanical power train for transferring the direction of motion from the sensor 50a to the steerable wheel 3 at the rear of the trailer 2b is disclosed in co-pending application of Ser. No. 337,292, which has been incorporated herein by reference. The power train itself is also disclosed in U.S. Pat. No. 4,740,006, which has also been incorporated by reference.

The power train functions in the following manner. The directional sensor 50a is in pressurized contact with a first circular gear similar in structure but larger in diameter than the first gear 22 shown in FIG. 7. The first gear engages an arcuate second gear similar in structure but larger in diameter than the second gear 24 shown in FIG. 7. The configuration of the gears used in the fifth embodiment of a tractor-trailer is perpendicular to that of the gears 22 and 24 as shown in FIG. 7. More specifically, in the present embodiment the diameters of the gears lie in a horizontal plane.

The first gear is designed to control the steerable wheels 3 at the rear of the trailer 2b in accordance with the sensed direction of motion of the tractor 1 and with the geometry of the tractor 1 and the trailer 2b. The second gear engages one end of a first shaft, which acts as a drive shaft. The other end of the drive shaft is coupled to a second shaft through a first gear box. The shaft is coupled to a steering shaft proximate the steerable wheels 3 near the rear of the trailer 2b.

The drive shaft is made up of first, second, third, and fourth segments. The first segment is coupled to a second segment by a spline, which prevents relative rotary movement of the segments while permitting longitudional movement thereof. The second segment is provided with a first bushing to stabilize the second segment of the drive shaft, and to limit the movement of the second segment in any direction except longitudionally.

A first universal joint (U-joint) is used to couple the second segment of the drive shaft to a third segment, which is also provided with a second bushing. A second U-joint is similarly used to connect the third segment to a fourth segment of the drive shaft, the fourth segment being provided with a third bushing. The first, second, third, and fourth segments comprise in combination the drive shaft for the power train which steers the trailer 2b. The U-joints allow for non-colinearity of the segments of the drive shaft.

The direction of motion is transmitted from the sensor to the first gear to the second gear to the drive shaft to the first gear box to the steering shaft to the second gear box. The second gear box controls a Pitman arm near the rear of the trailer 2b, and the Pitman arm forcibly steers the steerable wheels 3 at the rear of the trailer 2b.

Other directional sensors disclosed by the patent application of Ser. No. 337,292 and by U.S. Pat. No. 4,740,006 may be substituted for the sensor 50a.

In an eighth embodiment the mechanical power train just described for the seventh embodiment is used, and the trailer 2b is further provided with a third fixed axle 4 near the front end of the trailer. Two pairs of steerable wheels 3 are mounted on spindles 6 connected to the third axle 4. The wheels 3 mounted on the third axle 4 are forcibly and mechanically steered in accordance with the direction of motion sensed by the directional sensor 50a or other sensors disclosed by the patent application of Ser. No. 337,292 and U.S. Pat. No. 4,740,006.

In a ninth embodiment, the fixed wheels 3a on the second fixed axle 4 near the center of the trailer 2b are replaced by steerable wheels 3, which are forcibly and mechanically steered in the same manner and using the same mechanical power train as disclosed above for the seventh embodiment.

A tenth embodiment provides a trailer with a first fixed axle 4 having two pairs of fixed wheels 3a at the rear, a second fixed axle 4 with two pairs of steerable wheels 3 near the front end of the trailer, and a third fixed axle 4 with two pairs of steerable wheels 3 disposed near the longitudinal center of the trailer. The steerable wheels 3 are forcibly and mechanically steered using the power train disclosed above for the seventh embodiment.

An eleventh embodiment provides a trailer with a first fixed axle 4 having two pairs of steerable wheels 3 near the rear of the trailer, a second axle with two pairs of steerable wheels 3 near the front end of the trailer, and a third fixed axle 4 having two pairs of fixed wheels 3a near the longitudinal center of the trailer. The steerable wheels 3 are forcibly and mechanically steered using the power train described above for the seventh embodiment.

A twelfth embodiment provides a trailer having a first fixed axle 4 with two pairs of fixed wheels 3a near the rear of the trailer, and a second fixed axle 4 with two pairs of steerable wheels 3 near the front end of the trailer. The steerable wheels 3 are forcibly and mechanically steered using the mechanical power train disclosed above for the seventh embodiment.

In all of the foregoing embodiments and in all of the following embodiments, it is to be understood that when two fixed axles 4 aft of the front wheels 3 are provided in either extended vehicles and tractor-trailer vehicles, the steering system branches to provide separate controls for the steerable wheels 3 on each axle 4.

In the following embodiments of tractor-trailer assemblies comprising trailers steered by remote control, the means of forcibly steering the steerable wheels 3 of the trailer include the electronic means disclosed hereinabove for extended motor vehicles, such means being specifically shown in FIGS. 10 and 11.

A thirteenth embodiment of a trailer steered by remote control using electronic means 72, 100 comprises a trailer having a directional sensor 50a disposed within a fifth wheel 8a (shown in FIG. 14) and connected by rod 21e to an electrical sensor 76 shown in FIGS. 10 and 11. Instead of being connected to the shaft 88 as shown in FIG. 11, the pointer 84 is fastened to the rod 21e. Instead of being fastened to the frame 9 of an extended vehicle as indicated in FIG. 10, the sensor 76 is fastened to the frame 10a of a trailer. The remaining structure and functions of the electronic system 100 (FIG. 11) are the same as shown and described above for the extended motor vehicle.

The trailer is provided with a first fixed axle 4 having two pairs of steerable wheels 3 near the rear end of the trailer, and with a second fixed axle 4 having two pairs of fixed wheels 3a near the longitudinal center of the trailer. The steerable wheels 3 are forcibly and electronically steered using the electronic steering system just described.

In a fourteenth embodiment of a tractor-trailer assembly, the trailer is provided with a first fixed axle 4 having two pairs of fixed wheels 3a near the rear end of the trailer, a second fixed axle with fixed wheels near the longitudinal center of the trailer, and a third fixed axle 4 with steerable wheels 3 near the front end of the trailer, the steerable wheels 3 being forcibly and electronically steered as in the thirteenth embodiment described above.

In a fifteenth embodiment, the trailer is provided with a first fixed axle 4 having two pairs of fixed wheels 3a near the aft end of the trailer, and a second fixed axle 4 with steerable wheels 3 near the longitudinal center of the trailer, the steerable wheels 3 being forcibly and electronically steered as described above for the thirteenth embodiment.

In a sixteenth embodiment, the trailer is provided with a first fixed axle 4 having two pairs of fixed wheels 3a near the aft end of the trailer, a second fixed axle having two pairs of steerable wheels 3 near the longitudinal center of the trailer, and a third axle having two pairs of steerable wheels 3 disposed near the forward end of the trailer, the steerable wheels 3 being forcibly and electronically steered as described above for the thirteenth embodiment.

In a seventeenth embodiment, the trailer is provided with a first fixed axle 4 having two pairs of steerable wheels 3 near the aft end of the trailer, a second fixed axle 4 having two pairs of fixed wheels 3a near the longitudinal center of the trailer, and a third fixed axle 4 having two pairs of steerable wheels 3 near the forward end of the trailer, the steerable wheels 3 being forcibly and electronically steered as described above for the thirteenth embodiment.

In a nineteenth embodiment, the trailer is provided with a first fixed axle 4 having two pairs of fixed wheels 3a near the aft end of the trailer, and a second fixed axle 4 having two pairs of steerable wheels 3 near the forward end of the trailer, the steerable wheels 3 being forcibly and electronically steered as described above for the thirteenth embodiment of a tractor-trailer made in accordance with the principles of the present invention.

All of the embodiments hereinbefore disclosed, relating both to extended vehicles and to tractor-trailer assemblies, are optionally available either as retrofits to existing vehicles or as an integral part of manufactured vehicles.

The steering system 60 shown in FIG. 5 is preferable for shorter and lighter extended vehicles. The steering system 16 shown in FIG. 6 is preferable for longer and heavier extended vehicles, and for tractor-trailer assemblies.

I claim:

1. An extended motor vehicle having front and rear ends, the vehicle comprising:
   (a) an elongated, integral chassis including a frame;
   (b) a body including a motor, mounted on the frame;
   (c) a first pair of steerable wheels rotatably mounted on spindles attached to opposite ends of a first fixed axle at the front end of the vehicle;
   (d) a second pair of steerable wheels rotatably mounted on spindles attached to opposite ends of a second fixed axle at the rear end of the vehicle;
   (e) a pair of fixed wheels rotatably mounted on opposite ends of a third fixed axle disposed between and spaced apart from the first and second axles, at least one of the second and third axles being a driving axle;
   (f) a steering wheel for directing the motion of the motor vehicle; and
   (g) means for forcibly steering the steerable wheels in accordance with the orientation of the steering wheel and the geometry of the motor vehicle, said geometry being inclusive of the disposition and spacing of the axles and of the dimensions of the motor vehicle, said means for forcibly steering the steerable wheels including (g1) a steering column connected to the steering wheel;

(g2) first and second segments of a first steering shaft;

(g3) a first universal joint connecting the steering column to the first segment of the steering shaft;

(g4) a second universal joint connecting the first and second segments of the steering shaft to one another;

(g5) a first steering-gear box connected to the second segment of the steering shaft;

(g6) a first gear;

(g7) a second gear adapted to engage the first gear, the first and second gears forming in combination a mechanical sensor for detecting the orientation of the steering shaft and thereby the orientation of the steering wheel, the second gear being mounted on (g8) a first Pitman arm having first and second ends, the first end of the first Pitman arm being connected to the first gear box, the second end of the first Pitman arm being connected by a drag link to a power train which comprises (g9) a first shaft having first and second ends, the first end of the first shaft being connected to the first gear, the second end of the first shaft being connected to a second shaft in a substantially perpendicular configuration by a third universal joint;

(g10) first and second bushings in which the second shaft is disposed;

(g11) a third shaft substantially colinear with the second shaft;

(g12) a spline connecting the second and third shafts to one another;

(g13) a third bushing in which the third shaft is disposed;

(g14) a fourth shaft substantially colinear with the second and third shafts;

(g15) a third universal joint connecting the third and fourth shafts to one another, the spline preventing relative rotary movement of the second and third shafts while permitting longitudional movement thereof, the bushings stabilizing the shafts and limiting the movements of the shafts in any direction except longitudionally, the third and fourth universal joints allowing and compensating for non-colinearity of the shafts which the universal joints connect to one another;

(g16) a second steering shaft;

(g17) a second gear box coupling the fourth shaft to the second steering shaft;

(g18) a second Pitman arm;

(g19) a third gear box coupling the second steering shaft to the second Pitman arm; and (g20) spindles connected to and forcibly steered by the second Pitman arm, the spindles being attached to opposite ends of the second fixed axle.

2. An extended motor vehicle having front and rear ends, the vehicle comprising:

(a) an elongated, integral chassis including a frame;

(b) a body including a motor, mounted on the frame;

(c) a first pair of steerable wheels rotatably mounted on spindles attached to opposite ends of a first fixed axle at the front end of the vehicle;

(d) a second pair of steerable wheels rotatably mounted on spindles attached to opposite ends of a second fixed axle at the rear end of the vehicle;

(e) a pair of fixed wheels rotatably mounted on opposite ends of a third fixed axle disposed between and spaced apart from the first and second axles, at least one of the second and third axles being a driving axle;

(f) a steering wheel for directing the motion of the motor vehicle; and (g) means for forcibly steering the steerable wheels in accordance with the orientation of the steering wheel and the geometry of the motor vehicle, said geometry being inclusive of the disposition and spacing of the axles and of the dimensions of the motor vehicle, said means for forcibly steering the steerable wheels including (g1) a steering column connected to the steering wheel;

(g2) a first steering shaft having first and second ends;

(g3) a first universal joint connecting the steering column to the first end of the steering shaft;

(g4) a first steering-gear box connected to the second end of the first steering shaft;

(g5) a first gear;

(g6) a second gear adapted to engage the first gear, the first and second gears forming in combination a mechanical sensor for detecting the orientation of the steering shaft and thereby the orientation of the steering wheel, the second gear being mounted on (g7) a first Pitman arm having first and second ends, the first end of the first Pitman arm being connected to the first gear box, the second end of the first Pitman arm being connected to a power train comprising a plurality of shafts having first and second ends, the shafts being flexibly joined to one another, beginning with a first shaft and terminating in a rearmost shaft, the first end of the first shaft being connected to the first gear box;

(g8) a second steering shaft;

(g9) a second gear box coupling the rearmost shaft to the second steering shaft;

(g10) a second Pitman arm;

(g11) a third gear box coupling the second steering shaft to the second Pitman arm; and (g12) spindles connected to and forcibly steered by the second Pitman arm, the spindles being attached to opposite ends of the second fixed axle.

3. A mechanical sensor connected to a Pitman arm which forcibly steers a pair of steerable wheels, for detecting the orientation of a steering shaft and thereby the orientation of a steering wheel, and for transmitting the orientation of the steering wheel to the Pitman arm, the sensor comprising:

(a) a circular first gear forming part of a power train for steering the steerable wheels; and (b) an arcuate bow-shaped second gear mounted on the Pitman arm and connected to the steering shaft, the second gear being constructed and arranged to engage the circular first gear.

4. A motor vehicle comprising:

(a) a set of steerable front wheels;

(b) a set of steerable rear wheels;
(c) an intermediate set of non-steerable wheels disposed between the set of front wheels and the set of rear wheels;
(d) a rotating rear steering shaft;
(e) a gear; and
(f) a Pitman arm;

the set of rear wheels being steerable through the rotating rear steering shaft rotated by the gear, the Pitman arm engaging the gear and steering the set of front wheels.

* * * * *